US007967904B2

(12) United States Patent  
Bowden et al.

(10) Patent No.: US 7,967,904 B2
(45) Date of Patent: *Jun. 28, 2011

(54) BIODEGRADABLE OR COMPOSTABLE CONTAINERS

(75) Inventors: Joe A. Bowden, Durango, CO (US); Christine C. Johnston, Durango, CO (US)

(73) Assignee: New Ice Limited, Isle of Man ( * ) Notice: Subject to any disclaimer, the term of this patent is extended or adjusted under 35 U.S.C. 154(b) by 0 days.

This patent is subject to a terminal disclaimer.

(21) Appl. No.: 12/367,628

(22) Filed: Feb. 9, 2009

(65) Prior Publication Data

US 2009/0258172 A1 Oct. 15, 2009

Related U.S. Application Data

(60) Continuation of application No. 11/486,722, filed on Jul. 14, 2006, now abandoned, which is a continuation of application No. 10/977,082, filed on Oct. 29, 2004, now Pat. No. 7,083,673, which is a division of application No. 10/341,288, filed on Jan. 13, 2003, now Pat. No. 6,878,199.

(60) Provisional application No. 60/348,003, filed on Jan. 11, 2002.

(51) Int. Cl.
*B32B 21/02* (2006.01)
*C08L 3/02* (2006.01)

(52) U.S. Cl. ............... 106/162.51; 264/109; 264/112; 428/535

(58) Field of Classification Search .................. None
See application file for complete search history.

(56) References Cited

U.S. PATENT DOCUMENTS

| | | | |
|---|---|---|---|
| 4,172,154 A | 10/1979 | von Rymon Lipinski | |
| 4,492,729 A | 1/1985 | Bannerman et al. | |
| 4,863,655 A | 9/1989 | Lacourse et al. | |
| 5,061,556 A | 10/1991 | Dotzauer et al. | |
| 5,122,231 A | 6/1992 | Anderson | |
| 5,252,271 A | 10/1993 | Jeffs | |
| 5,320,669 A | 6/1994 | Lim et al. | |
| 5,389,322 A | 2/1995 | Kim et al. | |
| 5,428,150 A | 6/1995 | De Bock et al. | |
| 5,462,982 A | 10/1995 | Bastioli et al. | |
| 5,540,962 A | 7/1996 | Suskind | |
| 5,569,692 A | 10/1996 | Bastioli et al. | |
| 5,618,341 A | 4/1997 | Andersen et al. | |
| 5,660,900 A | 8/1997 | Andersen et al. | |
| 5,679,145 A | 10/1997 | Andersen et al. | |
| 5,683,772 A | 11/1997 | Andersen et al. | |
| 5,709,827 A | 1/1998 | Andersen et al. | |
| 5,736,209 A | 4/1998 | Andersen et al. | |
| 5,810,961 A | 9/1998 | Andersen et al. | |
| 5,849,152 A | 12/1998 | Arnold et al. | |
| 5,868,824 A | 2/1999 | Andersen et al. | |
| 5,916,503 A | 6/1999 | Rettenbacher | |
| 6,168,857 B1 | 1/2001 | Andersen et al. | |
| 6,284,838 B1 | 9/2001 | Silbiger | |
| 6,303,000 B1 | 10/2001 | Floyd et al. | |
| 6,451,170 B1 | 9/2002 | Anderson et al. | |
| 6,533,854 B2 | 3/2003 | Kesselring et al. | |
| 6,878,199 B2 * | 4/2005 | Bowden et al. ........... | 106/162.5 |
| 7,083,673 B2 * | 8/2006 | Bowden et al. ........... | 106/162.51 |
| 2002/0108532 A1 | 8/2002 | Kesselring et al. | |

FOREIGN PATENT DOCUMENTS

| | | |
|---|---|---|
| CN | 1 172 628 A | 2/1998 |
| DE | 197 51 234 A1 | 5/1999 |
| EP | 0 773 721 B1 | 5/1997 |
| EP | 0 524 920 A1 | 5/1999 |
| EP | 1702950 A2 | 9/2006 |
| EP | 1790583 A1 | 5/2007 |
| EP | 1806297 A1 | 11/2007 |
| WO | WO 92/18325 A1 | 10/1992 |
| WO | WO 96/05254 A1 | 2/1996 |
| WO | WO 97/23333 A1 | 7/1997 |
| WO | WO 97/37842 A1 | 10/1997 |
| WO | WO 99/02598 A1 | 1/1999 |
| WO | WO 00/44826 A1 | 3/2000 |
| WO | WO 00/39213 A1 | 7/2000 |
| WO | WO 00/44826 A1 | 8/2000 |
| WO | WO 01/05892 A1 | 1/2001 |
| WO | WO 01/51556 A1 | 7/2001 |
| WO | WO 01/51557 A1 | 7/2001 |
| WO | WO 01/60898 A1 | 8/2001 |
| WO | WO 02/06131 A1 | 1/2002 |
| WO | WO 02/083386 A1 | 10/2002 |
| WO | WO 03/059756 A3 | 7/2003 |
| WO | WO 2005/012421 A1 | 2/2005 |
| WO | WO 2007/039046 A1 | 4/2007 |

OTHER PUBLICATIONS

Liang, M, "Disposable Plant Fibre Tableware Produce Method", XP002237448 & CN 1 175 628 A (abstract), Derwent Publications Ltd., London, GB, Aug. 1996.

* cited by examiner

*Primary Examiner* — Mary Lynn F Theisen
(74) *Attorney, Agent, or Firm* — King & Spalding LLP

(57) ABSTRACT

The present invention provides an improved method and materials for forming biodegradable containers that can hold food products in dry, damp or wet conditions and provides the biodegradable containers prepared according to the disclosed process. The containers are produced through the use of a pre-gelled starch suspension that is unique in its ability to form hydrated gels and to maintain this gel structure in the presence of many other types of materials and at low temperatures.

30 Claims, No Drawings

BIODEGRADABLE OR COMPOSTABLE CONTAINERS

This application is a continuation of U.S. patent application Ser. No. 11/486,722, filed Jul. 14, 2006, now abandoned, which is a continuation of U.S. patent application Ser. No. 10/977,082, filed Oct. 29, 2004, now U.S. Pat. No. 7,083,673, which is a divisional of U.S. patent application Ser. No. 10/341,288, filed Jan. 13, 2003, now U.S. Pat. No. 6,878,199, which claims the benefit of U.S. Provisional Application No. 60/348,003, filed Jan. 11, 2002.

FIELD OF THE INVENTION

This application is in the field of biodegradable and in particular compostable containers that can hold items in a dry, damp or wet condition. The products are based on novel starch compositions that can form and maintain a hydrated gel at low temperatures.

BACKGROUND OF THE INVENTION

Materials such as paper, paperboard, plastic, polystyrene, and even metals are presently used in enormous quantity in the manufacture of articles such as containers, separators, dividers, lids, tops, cans, and other packaging materials. Modern processing and packaging technology allows a wide range of liquid and solid goods to be stored, packaged, and shipped in packaging materials while being protected from harmful elements, such as gases, moisture, light, microorganisms, vermin, physical shock, crushing forces, vibration, leaking, or spilling. Many of these materials are characterized as being disposable, but actually have little, if any, functional biodegradability. For many of these products, the time for degradation in the environment can span decades or even centuries.

Each year, over 100 billion aluminum cans, billions of glass bottles, and thousands of tons of paper and plastic are used in storing and dispensing soft drinks, juices, processed foods, grains, beer and other products. In the United States alone, approximately 5.5 million tons of paper are consumed each year in packaging materials, which represents only about 15% of the total annual domestic paper production.

Packaging materials (e.g., paper, paperboard, plastic, polystyrene, glass, or metal) are all, to varying extents, damaging to the environment. For example, the manufacture of polystyrene products involves the use of a variety of hazardous chemicals and starting materials, such as benzene (a known mutagen and a probable carcinogen). Chlorofluorocarbons (or "CFCs") have also been used in the manufacture of "blown" or "expanded" polystyrene products. CFCs have been linked to the destruction of the ozone layer.

Due to widespread environmental concerns, there has been significant pressure on companies to discontinue the use of polystyrene products in favor of more environmentally safe materials. Some groups have favored the use of products such as paper or other products made from wood pulp. However, there remain drawbacks to the sole use of paper due to the tremendous amount of energy that is required to produce it. A strong need to find new, easily degradable materials that meet necessary performance standards remains.

Degradability is a relative term. Some products which appear to be degraded merely break apart into very small pieces. These pieces are hard to see, but can still take decades or centuries to actually break down. Other products are made from materials which undergo a more rapid breakdown than non-biodegradable products. If the speed of this degradation is such that the product will degrade within a period of less than approximately 24 days under normal environmental conditions, the product is said to be compostable. Achievement of products made of compostable materials which also meet a variety of needs, such as containers for products in a damp or wet condition, has posed a significant challenge.

One solution has been to make packaging materials out of baked, edible sheets, e.g., waffles or pancakes made from a mixture of water, flour and a rising agent. Although edible sheets can be made into trays, cones, and cups which are easily decomposed, they pose a number of limitations. For example, since fats or oils are added to the mixture to permit removal of the sheet from the baking mold, oxidation of these fats cause the edible sheets to go rancid. In general, edible sheets are very brittle and far too fragile to replace most articles made from conventional materials. They are also overly sensitive to moisture and can easily mold or decompose prior to or during their intended use.

Starch is a plentiful, inexpensive and renewable material that is found in a large variety of plant sources, such as grains, tubers, and fruits. In many cases, starch is discarded as an unwanted byproduct of food processing. Starch is readily biodegradable and does not persist in the environment for a significant period after disposal. Starch is also a nutrient, which facilitates its breakdown and elimination from the environment.

Due to the biodegradable nature of starch, there have been many attempts to incorporate it into a variety of materials. Starch has been incorporated into multi-component compositions in various forms, including as filler and binder, as has been used as a constituent within thermoplastic polymer blends.

Starch can be used as a binder or glue to adhere solid constituents together to form a heterogenous mixture of different components. At some point before or during the molding phase, the starch is typically dissolved or gelatinized in an appropriate solvent, such as water, so that the starch becomes a flowable material into which the other components can be dispersed. Since native starch has a melting point that approaches its decomposition temperature, it is necessary to add polar liquids or solvents to allow the starch to become molten, solvated or otherwise liquified into a plastic state at a temperature that is safely below its decomposition temperature. Upon resolidification of the gelatinized starch, typically by removing enough of the water by evaporation so that the starch recrystallizes or otherwise dries out, the starch forms a solid or semi-solid binding matrix that can bind the remaining components together. Although many have attempted for years to perfect a starch blend that would yield an environmentally sound material while, at the same time, being economical to make, such a combination has not yet been achieved.

There remains a need in the art to provide a fully compostable product that is strong, not prone to mold or pests, and can be readily and inexpensively made. Furthermore, there is a need to develop a robust method to develop compostable products that can be used to hold dry, wet or damp material at a range of temperatures.

PCT Publication No. WO 99/02598, filed by Business Promotions, Inc., describes a method for making a biodegradable product for use as a container for foodstuffs, including hot and cold liquids. The product is manufactured under pressure and heat in a mold, based on a basic material made of amylose-comprising flour derived from an edible crop plant, wood flour, natural wax and water. The basic material consists substantially of a moist granulate comprising 50-250 parts by weight flour, 10-85 parts by weight wood flour, 2-30 parts by weight natural wax and 50-250 parts by weight water.

European Patent 0773721B1 to Coöperatieve Verkoop discloses compounds made of a starch suspension and a wax coating, which is baked into a base mold. The coating is made of a wax composition comprising at least 50% wax and having a melting temperature of at least 40° C. The starch composition is preferably made by a process that includes 5-75% of a starch derivative which has a reduced swelling capacity at increased temperatures when compared to native starch.

PCT Publication No. WO 01/60898, filed by Novamont describes products such as sheets of different thicknesses and profile based on destructured or complexed starch, which are biodegradable. In particular, the patent claims partly-finished products, for example a foam sheet material, comprising destructured or complexed starch foamed as a continuous phase, having a density between 20 and 150 kg/m$^3$, cell dimensions in a range between 25 and 700 µm with a cell distribution such that 80% of them have a dimension between 20 and 400 µm.

U.S. Pat. No. 6,451,170 to Cargill, Inc. describes improved starch compositions of cross-linked cationic starch, used in the papermaking process. The '170 patent claims the following papermaking process: 1) providing a cationized cross-linked starch component having a hot paste viscosity in the range of from about 200 cps to about 3000 cps as measured in a Brookfield visconeter at about 95° C. using a No. 21 spindle; 2) cooking a first portion of the starch component to generate a cooked starch component at an average cooking temperature below 330° F. for a period of time; 3) dewatering a paper furnish (the paper furnish including: (i) cellulosic fibers in an aqueous slurry, (ii) inorganic particles comprising at least 50 percent by weight particles having an average particle size of no greater than 1 micron, and (iii) the cooked starch component); and 4) adjusting the dewatering rate by cooking a second portion of the starch component at an average temperature at least 10° F. different than the first cooking temperature. The fourth step in the papermaking process can also include adjusting the first pass retention during dewatering by cooking a second portion of the starch composition at an average temperature at least 10° F. different than the first cooking temperature.

U.S. Pat. No. 5,122,231 to Cargill, Inc. describes a new cationic cross-linked starch for use in papermaking in the wet end system of a paper machine using a neutral or alkaline finish. The '231 patent claims methods to increase starch loading capacity in a papermaking process in which the papermaking process has a pH of about 6 or greater. One method is directed to adding the cationized cross-linked starch to a paper furnish of the process prior to the conversion of the furnish to a dry web wherein the starch is cationized to a degree of substitution on the hydroxyl groups of the starch between about 0.005 and about 0.050 and wherein after the cationization the starch is cross-linked to a hot paste viscosity in the range of from about 500 cps to about 3000 cps as measured on a Brookfield viscometer at about 95° C. using a No. 21 spindle. Another method is directed to adding cationized cross-linked starch to a paper furnish of the process in an amount effective for making Zeta potential of the furnish about zero and wherein the starch is cationized with monovalent cations and has a degree of substitution of monovalent cations on the hydroxyl groups of the starch between about 0.005 and about 0.050 and wherein after cationization the starch is cross-linked to a hot paste viscosity in the range of from about 500 cps to about 3000 cps as measured on a Brookfield viscometer at about 95° C. using a No. 21 spindle.

U.S. Pat. Nos. 5,569,692 and 5,462,982, both assigned to Novanont, disclose a composition for a biodegradable material which can be used at high temperatures comprising destructured starch, a thermoplastic polymer, and a plasticizer having a boiling point higher than 150° C. in an amount from 20 to 100% based on the weight of starch, said destructured-starch being obtained by destructuring starch as it is, without the addition of water. The inventors found that if a starch is destructured as it is, with the addition of a high-boiling plasticizer (such as glycerine) and a destructuring agent (such as urea), in an extruder heated to a temperature below the boiling point of the plasticizer (but between 120 and 170° C.), destructured starch compositions are obtained which can be mixed with polymers having relatively high melting points and are suitable for extrusion at temperatures higher than 120° C. at low pressure. The compositions thus obtained are particularly suitable for subsequent operations such as thermoforming and blowing.

U.S. Pat. No. 5,252,271 to Bio-Products International discloses a material that is based on a dry starch composition, having no greater than 30% water content; which is mixed with a mild acid in dry, powdered form (preferably malic acid, tartaric acid, citric acid, maleic acid and succinic acid) at a percentage of 0.2 to 7% of the total starch composition. Adding a dry, powdered carbonate composition capable of reacting with acid to generate $CO_2$ gas at a composition percentage of 0.1 to 2% of the total starch composition and mixing and advancing the product with water within an extrusion barrel of the extrusion means to generate elevated heat and pressure for converting the material to a gelatinous state that can be dried and remain pliable.

U.S. Pat. No. 4,863,655 to National Starch and Chemical Corp. discloses a biodegradable packaging material comprising an expanded, high amylose starch product having at least 45% (by weight of the final material) amylose content and a low density, closed cell structure with good resilience and compressibility. Another embodiment provides a method of preparing the packaging material with a total moisture content of 21% or less by weight, at a temperature of from 150 to 250° C.

U.S. Pat. No. 5,428,150 to Cerestar Holdings discloses a method for making a starch-containing composition to produce a material suitable for the production of molded articles in which the composition contains in addition to the starch a starch degradation product selected from starch hydrolysis products having dextrose equivalent's of 1 to 40, particularly a maltodextrin, oxidized starches and pyrodext.

U.S. Pat. Nos. 5,660,900, 5,868,824, and PCT Publication No. WO 96/05254 filed by Khashoggi disclose compositions for manufacturing biodegradable articles from highly inorganically filled materials having a starch-based binder. These documents describe articles of manufacture that have high levels of the inorganic filler in a polymer matrix without adverse affects on the properties of the binding system. The articles contain a matrix of starch and at least one inorganic aggregate, present as at least about 20% by weight (or 5% by volume) of the final mixture. The matrix is prepared from about 10% to 80% of a starch-based binder that has been substantially gelatinized by water and then hardened through the removal of a substantial quantity of the water by evaporation with an inorganic aggregate dispersed throughout the starch-bound cellular matrix. The mixture is designed with the primary considerations of maximizing the inorganic components, minimizing the starch component and solvent, and selectively modifying the viscosity to produce articles that have the desired properties for their intended use.

U.S. Pat. Nos. 5,736,209 and 5,810,961, and PC Publication No. WO 97/37842, also assigned to Kashoggi Industries, disclose methods to develop biodegradable paper and products which include a binding matrix of starch and cellulosic ether, and fibers substantially homogeneously dispersed throughout the matrix. The '209 patent discloses a concentration range for the starch of about 5% to about 90% by weight of solids in the sheet, for the cellulosic ether a range from about 0.5% to about 10% by weight of solids, and for fibers a concentration range from about 3% to about 40%. Optionally, an inorganic mineral filler can be added. Sheets produced using this biodegradable material having a thickness less than about 1 cm and a density greater than about 0.5 g/cm$^3$ are described.

PCT Publication No. WO 01/51557, also filed by Khashoggi, is directed to compositions and methods for manufacturing thermoplastic starch compositions having a particulate filler (present in an amount greater than about 15% by weight of the thermoplastic starch) and, optionally, fiber reinforcement. Native starch granules are made thermoplastic by mixing and heating in the presence of an appropriate plasticizer (including somewhat polar solvents such as water or glycerin) to form a starch melt. The starch melt is then blended with one or more non-starch materials in order to improve the properties and reduce the cost of the resulting thermoplastic starch composition. A particulate filler component is thereafter blended with the starch melt, preferably an inexpensive, naturally occurring mineral particulate filler ("inorganic filler"), included in an amount greater than about 15% by weight of the thermoplastic starch composition. In addition, this reference discloses a composition comprising a thermoplastic starch melt having a water content of less than about 5% by weight while in a melted state, wherein at least one plasticizer has a vapor pressure of less than about 1 bar when in a melted state and in which a solid particulate filler phase is dispersed and included in an amount from about 5% to about 95% by weight. An additional embodiment discloses dispersion of a solid particulate filler phase in an amount from about 5% to about 95% by weight of the thermoplastic starch composition and a fibrous phase in a concentration of from about 3% to about 70% by weight.

U.S. Pat. No. 6,168,857 to Khashoggi Industries discloses a starch-bound sheet having a thickness less than about 1 cm and a density greater than about 0.5 g/cm$^3$ comprising: (a) a binding matrix including starch and an auxiliary water-dispersible organic polymer, wherein the starch has a concentration greater than about 5% by weight of total solids in the sheet; and (b) fibers substantially homogeneously dispersed throughout the starch-bound sheet; and optionally an inorganic mineral filler.

U.S. Pat. Nos. 5,618,341, 5,683,772, 5,709,827, and 5,679,145 and PCT publication No. WO 97/2333, assigned to Khashoggi Industries, disclose starch-based compositions that can be used in making containers. U.S. Pat. Nos. '341 and '145 teach methods for dispersing fibers within a fibrous composition comprising the steps of: (a) combining together water, fibers, and a thickening agent such that the thickening agent (such as a pregelatinized starch) and water interact together to form a fluid fraction that is characterized by a yield stress and viscosity that enables the fibers to be substantially uniformly dispersed throughout the fibrous composition as the fibers and fluid fraction are mixed together, the fibers having an average length greater than about 2 mm and an average aspect ratio greater than about 25:1; and (b) mixing together the combined thickening agent, water, and fibers in order to substantially uniformly disperse the fibers throughout the fibrous composition. The thickening agent is included in an amount in a range from about 5% to about 40% by weight of the fluid fraction. The inventive method involves a fluid system that is able to impart shear from a mechanical mixing apparatus down to the fiber level in order to obtain a starch-based composition having substantially uniformly dispersed fibers. U.S. Pat. No. '772 additionally discloses an inorganic filler to enhance the strength and flexibility of the articles. '827 additionally discloses methods to make the article of manufacture that is developed from mixtures including fibers having an average aspect ratio greater than about 25:1. The '341, '772, '827, and '145 patents and WO 97/2333 application, disclose high aspect ratios (i.e., about 25:1 or greater) and long-length (i.e., at least about 2 mm) fibers to reinforce the structure. PCT publication No. WO 97/23333 discloses articles that contain high starch contents (from about 50% to about 88% by weight ungelatinized and about 12% to about 50% by weight of gelatinized starch).

U.S. Pat. No. 6,303,000 to Omnova Solutions discloses a method to improve the strength of paper by adding an aqueous cationic starch dispersion modified with a blocked glyoxal resin to a paper pulp slurry. The starch dispersion is prepared by gelatinizing an aqueous suspension of starch granules (including potato, corn, waxy corn, red and white milo, wheat and tapioca, thin-boiling starches, and starches that have been additionally chemically modified) and reacting the starch with a blocked glyoxal resin at temperatures of at least 70° C., preferably 85 to 95° C. Suitable blocked glyoxal resins which can be used with the invention include cyclic urea/glyoxal/polyol condensates, polyol/glyoxal condensates, urea or cyclic urea/glyoxal condensates and glycol/glyoxal condensates in an amount from about 3% to about 30%, preferably 9 to 20%, of the total dry weight of starch. The resulting gelatinized starch composition can be cooled and stored, or directly added to a dilute paper pulp slurry to increase the tensile strength and elasticity of the resulting paper product.

PCT Publication No. WO 01/05892 filed by Kim & Kim describes methods for manufacturing plastic-substitute goods by using natural materials by preparing a glue made by mixing 20% by weight of a starch and 80% by weight of water together, heating this mixture; washing and drying rice husks to a drying extent of 98%; mixing the glue and the rice husks together so as to form a mixture of the glue and the rice husks, drying them to a drying extent of 98%, and crushing them to a size range of 01.1-0.1 mm. Then, mixing 80% by final weight of the mixture of the glue and the rice husks, 5% by final weight water, and 15% by final weight of rosin to form a final mixture; and molding the final mixture using a molding machine at a temperature of 100-350° C. under a pressure of 5 kg/cm at a production frequency of 30-80 seconds per product.

PCT Publication No. WO 02/083386 also filed by Kim & Kim describes methods for manufacturing plastic-substitute goods by using natural materials using a starch-based glue and melamine-resin. Melamine or urea resin is a thermosetting resin which is formed by reaction of melamine or urea acting upon formaldehyde. The products are manufactured by first preparing a mixture of 20% by weight of a starch and 80% by weight of water, heating this mixture; washing and drying rice husks to a drying extent of 98%; mixing the glue and the rice husks together so as to form a mixture of the glue and the rice husks, drying them to a drying extent of 98%, and crushing them to a size range of 0.01-0.1 mm. Melamine resin is obtained by a process of first, mixing 30% by weight of formaldehyde solution and 70% by weight of water, 30% by weight of melamine or urea and heating the mixture at a temperature of 350° C. A mixture is then made of 70% by final weight of the mixture of the glue and the rice husks, 15% by weight of water, and 15% by weight of melamine resin to form a final mixture. The final mixture is molded by a molding machine at a temperature of 100 350° C. under a pressure of 5 kg/cm at a product ion frequency of 30-80 seconds per product.

U.S. Publication No. US 2002/0108532 and PCT Publication No. WO 00/39213 filed by Apack AG disclose methods to produce a shaped body made of biodegradable material that shows good expansion behavior during thermoforming from 7.6 to 8.5% by weight of cellulosic fibers, from 16.1 to 17.6% by weight of native starch, from 5.4 to 6% by weight of pregelatinized starch and from 68.0 to 70.6% by weight of water. First, the pregelatinized starch is produced by mixing between 5.4-6% starch and 94-94.6% water, heating the mixture to 68-70° C., holding the mixture constant at 68-70° C. for 10 minutes, and cooling the pregelatinized starch to 50° C. Then, adding the 16.1 to 17.6% by weight of native starch, 7.6 to 8.5% by weight of cellulosic fibers, and 68.0 to 70.6% by weight of water to the pregelatinized solution at a temperature of 50° C.; mixing for 5 minutes to achieve a homogeneous mixture at 40° C., not allowing the mixture to substantially cool, and placing the mixture in a baking mold, and baking the mixture at 100-200° C. for 10-100 seconds to form the shaped body.

German patent DE 19,706,642 to Apack Verpackungen Gmbh discloses the production of a biodegradable article from 25-75% fibers, 13-38% starch and 13-38% water. First, the 25-75% fibers, 13-38% starch are mixed in a dry state in a continuous process; then water is admixed continuously. The mixture is then subjected to a baking process to obtain the finished molded article, and then the molded article is coated with a biologically degradable film that is impermeable to humidity.

Although numerous attempts have been made to provide suitable biodegradable and compostable materials for packaging, the resulting substances are not ideal. The currently available materials either cannot successfully be used to package materials, particularly those that are wet, or do not effectively degrade under normal environmental conditions. A need exists to develop materials that will reduce the build up of disposed, slowly degrading materials, and to limit the environmental damage caused by toxic chemicals used in the production of packaging materials.

It is therefore an object of the present invention to provide a robust process and materials for the production of an efficiently biodegradable container.

It is a further object of the present invention to provide a materials and a process for producing a biodegradable container that can hold products in dry, wet or damp conditions.

It is another object of the present invention to provide material and a process to produce biodegradable containers through the use of a pregelatinized starch solution that is stable at a wide range of temperatures.

It is a further object of the present invention to provide a process and material to produce biodegradable containers through the use of a pregelatinized paper starch solution that is stable at a wide range of temperatures.

It is another object of the present invention to provide a process and material to produce biodegradable containers from a wide range of materials.

It is yet another object of the present invention to provide a process and material to produce biodegradable containers under a wide range of environmental conditions.

It is still another object of the present invention to provide biodegradable and compostable products.

SUMMARY OF THE INVENTION

The present invention provides an improved method and materials, for forming biodegradable containers that can hold food products in dry, damp or wet conditions. The containers are produced through the use of a pre-gelled starch suspension that is unique in its ability to form hydrated gels and to maintain this gel structure in the presence of many other types of materials and at low temperatures. In addition, this pre-gelled starch has the ability to melt into plastic like materials at relatively low temperatures in the presence of a wide range of materials under varying environmental conditions. Further, this pre-gelled material allows for the development of containers with high binding strengths and open cell structures to provide insulation and cross-linking of components.

One aspect of the present invention is a process for forming a biodegradable container by:

(a) forming a pre-gelled starch suspension that is maintained at low temperatures, for example, between 0-60° C., preferably between 0-40° C.;

(b) adding to the pre-gelled starch suspension a dry or damp, homogeneous mixture containing at least wood fibers having an aspect ratio between approximately 1:2 and 1:8 (width:length) to form a homogenous moldable composition; and (c) molding the homogenous moldable composition with heat to form a biodegradable container.

In another embodiment, the present invention is a process for forming a biodegradable container by:

(a) forming a first pre-gelled starch suspension that is maintained at a low temperature, for example, preferably 0-60° C., most preferably between 0-40° C.;

(b) mixing together wood fibers or flour (having an aspect ratio between approximately 1:2 and 1:8), a second pre-gelled starch suspension, and/or a native starch to form a homogenous mixture;

(c) adding to the pre-gelled starch suspension the dry or damp, homogeneous mixture to form a homogenous moldable composition; and (d) molding the homogenous moldable composition with heat to form a biodegradable container.

In a specific embodiment, the present invention is a process for forming a biodegradable container by:

(a) forming a pre-gelled starch suspension (the pre-gel) produced from approximately 3-10% potato starch by weight of the pre-gel and approximately 90-97% water by weight of the pre-gel such that the pre-gelled suspension is maintained at low temperatures, for example, preferably 0-60° C., most preferably between 0-40° C.;

(b) mixing together wood fibers or flour (having an aspect ratio between approximately 1:2 and 1:8), a pre-gelled starch suspension produced from approximately 15% corn starch (by weight of the pre-gel) and approximately 85% water by weight of the pre-gel, and a native starch (for example approximately 50-70%, or, more specifically, 57-65.8%, corn starch (by weight of the homogenous moldable composition) or approximately 2-15% or, more specifically, 3-5% potato starch (by weight of the homogenous moldable composition)) to form a homogeneous mixture;

(c) adding to the pre-gelled potato starch suspension the homogenous mixture to form a final homogenous moldable composition; and (d) molding the homogenous moldable composition with heat to form a biodegradable container.

Another aspect of the present invention is a process for forming a biodegradable container by:

(a) forming a pre-gelled paper starch suspension that is maintained at low temperatures, for example, between 0-60° C., preferably between 0-40° C.;

(b) adding to the pre-gelled paper starch suspension a dry or damp, homogeneous mixture containing at least wood fibers having an aspect ratio between approximately 1:2 and 1:8 (width:length) to form a homogeneous moldable composition; and (c) molding the homogeneous moldable composition with heat to form a biodegradable container.

In other embodiments, the present invention is directed to a process for forming a biodegradable container by:

(a) forming a first pre-gelled paper starch suspension that is maintained at low temperatures, for example, between 0-60° C., preferably between 0-40° C.;

(b) mixing together wood fibers or flour (having an aspect ratio between approximately 1:2 and 1:8), and a native starch(s) to form a homogeneous mixture;

(c) adding to the first pre-gelled starch suspension the homogenous mixture to form a homogenous moldable composition; and (d) molding the homogeneous moldable composition with heat to form a biodegradable container.

In a specific embodiment, the present invention is directed to a process for forming a biodegradable container by:

(a) forming a pre-gelled starch suspension produced from approximately 2-15% potato starch (by weight of the pre-gel), preferably about 2.5, 5, 10, or 15%; approximately 5-10% paper pulp (by weight of the pre-gel), preferably about 5.9-8%; and approximately 75-95% water (by weight of the pre-gel) such that the pre-gelled suspension is maintained at low temperatures, for example, between 0-60° C., preferably between 0-40° C.;

(b) mixing together wood fibers or flour (having an aspect ratio between approximately 1:2 and 1:8, preferably between 1:2 and 1:4), native corn starch and native potato starch to form a homogeneous mixture;

(c) adding to the pre-gelled potato starch suspension the homogeneous mixture to form a homogenous moldable composition; and (d) molding the homogeneous moldable composition with heat to form a biodegradable container.

In other embodiments, the following materials can be added to the wood fibers to form a homogeneous mixture:

(i) waxes, fatty alcohols, phospholipids or other high molecular weight biochemicals, such as glycerol, for example between approximately 1-5% or, more specifically, 2.6-3.7% glycerol (by weight of the homogenous moldable composition);

(ii) approximately 0.5-20% water (by weight of the homogeneous moldable composition), preferably about 0.5-10%, 0.5-11% 0.5-12%, 10 or 20%;

(iii) baking powder, for example between approximately 0.1-15% by weight of the homogenous moldable composition, preferably about 0.42, 1 or 12%; and/or (iv) additional materials, such as up to approximately 5% by weight of the homogenous moldable composition of natural earth fillers, for example, clays such as bentonite, amorphous raw products such as gypsum and calcium sulfate, minerals such as limestone, or man made materials such as fly-ash.

In still other embodiments, the process comprises the steps of:

(a) forming a pre-gelled starch suspension or paper starch suspension that is maintained at a low temperature, for example, preferably from about 0-60° C., most preferably from about 0-40° C.;

(b) mixing together wood fibers or flour (having an aspect ratio between approximately 1:2 and 1:8) and (i) dry or damp starch, such as corn starch; (ii) pre-gelled starch, such as a pre-gelled corn starch produced from approximately 15% corn starch (by weight of the pre-gel) and 85% water; (iii) waxes, fatty alcohols, phospholipids and other high molecular weight biochemicals, such as glycerol, for example between approximately 1-5% glycerol (by weight of the homogenous moldable composition); (iv) approximately 0.5-20% water, preferably about 0.5-10%, 0.5-11% 0.5-12%, 10 or 20% (by weight of the homogenous moldable composition); (v) baking powder, for example between approximately 0.1-15% (by weight of the homogenous moldable composition), preferably 0.42, 1 or 12%; and/or (vi) additional materials, such as up to approximately 5%, 0-4%, 0-13%, 2-13%, or 0-15% by weight of the homogenous moldable composition of natural earth fillers, for example, clays such as bentonite, amorphous raw products such as gypsum and calcium sulfate, minerals such as limestone, and man made materials such as fly-ash to form a homogeneous mixture;

(c) adding to the pre-gelled starch suspension the dry or damp, homogeneous mixture to form a homogenous moldable composition; and (d) molding the homogenous moldable composition with heat to form a biodegradable container.

In one embodiment, the pre-gelled starch suspension is produced from approximately 2.5-15% starch (by weight of the pre-gel), such as potato or corn starch, and from approximately 85-97.5% of water by weight of the homogenous moldable composition. In another embodiment, the pre-gelled starch suspension is produced from approximately 2.5-5.5% starch and from approximately 94.5-97.5% water (by weight of the pre-gel). In preferred embodiments, the pre-gelled starch suspension is produced from approximately 2.5-10% potato starch, more preferably 3%, 5%, 7.5% or 10% potato starch, and 90, 92.5, 95 or 97% water (by weight of the pre-gel). In another preferred embodiment, the pre-gelled starch suspension is produced from approximately 15% corn starch (by weight of the pre-gel).

In another embodiment, the pregelled paper starch solution is produced from approximately 5-10% paper pulp (by weight of the pre-gel), preferably 5.9-8%, more preferably, 7.3-7.5, 6.5-6.7, or 5.9-6.1%; approximately 5-15%, preferably 10% potato or other natural starch (such as corn starch), and approximately 75-90% water (by weight of the pre-gel).

In one embodiment, the native starch can be corn starch or potato starch. In another embodiment potato starch and corn starch can be used together. In a further embodiment, the corn starch can comprise approximately 4-18%, preferably from 4.45-17.9%, or from about 5-35%, preferably 5.9-34.4% by weight of the homogenous moldable composition, preferably, 4, 5, 6, 13, 15, 16, 17, 18, 20, 21, 22, 26, 28, 29, 30, 31 or 34%.

In a still further embodiment, the wood fibers or flour can comprise approximately 11-24%, preferably 11, 12, 13, 14, 16, 17, 18, 19, 20, 21, 22, 23, or 23.3% by weight of the homogenous moldable composition that contains the pregelled starch solution. In an alternate embodiment, the wood fibers or flour can comprise approximately 7-11%, preferably 7, 8, 9, 10 or 11%, by weight of the homogenous moldable composition that contains the pregelled paper starch solution. The wood fibers or flour can have an aspect ratio, width to length of between approximately 1:2 and 1:10, 1:2 and 1:9, 1:2 and 1:8, 1:2 and 1:7, 1:2 and 1:6, 1:2 and 1:5, 1:2 and 1:4, 1:2 and 1:3, or a fraction thereof, for example a ratio of between 1:2 and 1:9.9.

In another embodiment, the containers which are formed using the method of the invention are efficiently biodegradable, preferably disintegrating to component parts in less than one year. In another embodiment, the containers are compostable, disintegrating to component molecules in less than six months, preferably in less than approximately 24 days.

In further embodiments, pressure can also be used in combination or alternation with heat to mold the biodegradable container. Any amount of pressure can be used that achieves the desired product, for example, pressure between approximately 2-3 psi may be appropriate. Likewise, any amount of heat may be used that achieves the desired result. For example, in one embodiment, the heat used to mold the biodegradable containers is between approximately 150-250° C.; preferably 195-225° C., most preferably 215° C.

In another embodiment, the container can be coated with any suitable liquid-resistant coating, Examples include, but are not limited to, coatings such as PROTECOAT® (from New Coat, Inc.), ZEIN® (a biodegradable material isolated from corn); polylactic acid (PLA, a polymer of lactic acid from fermentation feed stock); poly hydroxyalkanoates (PHA, from microbial fermentation); bacterial cellulose; chitosan based polymers (for example from shell fish wastes); or waxes and oil based coatings. These materials can be applied either as a thin film or can be sprayed/dipped onto the product. Bonding processes for application of thin films of water-resistant material are known in the art.

In one embodiment, a method is provided for creating a waterproof container by:
(a) forming a first pre-gelled starch suspension that is maintained at low temperatures, for example, between 0-60° C., preferably between 0-40° C.;
(b) mixing together wood fibers or flour (having an aspect ratio between approximately 1:2 and 1:8), and wax, fatty alcohol, phospholipids or other high molecular weight biochemicals, such as glycerol;
(c) adding to the first pre-gelled starch suspension the homogeneous mixture containing the wood fiber and other material;
(d) molding the homogeneous composition with heat to form a biodegradable container; and
(e) coating the container with a liquid-resistant coating, such as PROTECOAT® (from, New Coat, Inc.), ZEIN® (a biodegradable material isolated from corn); poly lactic acid (PLA, a polymer of lactic acid from fermentation feed stock); poly hydroxyalkanoates (PHA, from microbial fermentation); bacterial cellulose; chitosan based polymers (for example from shell fish wastes); or waxes and oil based coatings.

In another embodiment, it is recognized that to facilitate the coating of the molded article, as well as for other specific indications, such as decreasing the residual odor of wood in the final product, the amount of paper pulp can be increased to 50%, or 30-50%, by weight of the final mixture, and the amount of wood flour or fiber can be decreased to 0%.

In a further embodiment, a vacuum can be used to form a film around the molded article. When using a vacuum to form a film around the molded article, it is recognized that increasing the levels of wood flour/fiber and/or paper pulp can facilitate the vacuuming process. In one embodiment, the wood flour/fiber and/or paper pulp levels can be increased to 30, 40 or 50% by weight of the final mixture.

Thus, in an alternate aspect of the present invention, a process is provided for forming a biodegradable container by:
(a) forming a paper starch suspension, wherein the paper pulp that is maintained at low temperatures, for example, between 0-60° C., preferably between 0-40° C.; and
(b) molding the homogeneous moldable composition with heat to form a biodegradable container.

In one embodiment, a process is provided for forming a biodegradable container by:
(a) forming a paper starch suspension, wherein the pregelled paper starch solution is produced from up to approximately 50, 60, 75, 85 or 90% paper pulp (by weight of the pre-gel) and approximately 5-15%, preferably 10% potato or other natural starch (such as corn starch), and approximately 5.90% water (by weight of the pre-gel), and wherein the paper pulp that is maintained at low temperatures, for example, between 0-60° C., preferably between 0-40° C.; and
(b) molding the homogeneous moldable composition with heat to form a biodegradable container.

Another embodiment of the present invention provides a process for forming a biodegradable container by:
(a) forming a pre-gelled paper starch suspension that is maintained at low temperatures, for example, between 0-60° C., preferably between 0-40° C.;
(b) mixing together (i) 0-24% wood fibers or flour (having an aspect ratio between approximately 1:2 and 1:8) by weight of the homogenous moldable composition; (ii) dry or damp starch, such as corn starch; (iii) pre-gelled starch, such as a pre-gelled corn starch produced from approximately 15% corn starch (by weight of the pre-gel) and 85% water; (iv) waxes, fatty alcohols, phospholipids and other high molecular weight biochemicals, such as glycerol, for example between approximately 1-5% glycerol (by weight of the homogenous moldable composition); (v) approximately 0.5-20% water, preferably about 0.5-10%, 0.5-11% 0.5-12%, 10 or 20% (by weight of the homogenous moldable composition); (vi) baking powder, for example between approximately 0.1-15% (by weight of the homogenous moldable composition), preferably 0.42, 1 or 12%; and/or (vii) additional materials, such as up to approximately 5%, 0-4%, 0-13%, 2-13%, or 0-15% by weight of the homogenous moldable composition of natural earth fillers, for example, clays such as bentonite, amorphous raw products such as gypsum and calcium sulfate, minerals such as limestone, and man made materials such as fly-ash to form a homogeneous mixture;
(c) adding to the pre-gelled starch suspension the dry or damp, homogeneous mixture to form a homogenous moldable composition; and
(d) molding the homogenous moldable composition with heat to form a biodegradable container.

In a further embodiment, a process is provided for forming a biodegradable container by:
(a) forming a pre-gelled paper starch suspension that is maintained at low temperatures, for example, between 0-60° C., preferably between 0-40° C.;
(b) mixing together (i) 0-24% wood fibers or flour (having an aspect ratio between approximately 1:2 and 1:8) by weight of the homogenous moldable composition; (ii) dry or damp starch, such as corn starch; (iii) pre-gelled starch, such as a pre-gelled corn starch produced from approximately 15% corn starch (by weight of the pre-gel) and 85% water; (iv) waxes, fatty alcohols, phospholipids and other high molecular weight biochemicals, such as glycerol, for example between approximately 1-5% glycerol (by weight of the homogenous moldable composition); (v) approximately 0.5-

20% water, preferably about 0.5-10%, 0.5-11% 0.5-12%, 10 or 20% (by weight of the homogenous moldable composition); (vi) baking powder, for example between approximately 0.1-15% (by weight of the homogenous moldable composition), preferably 0.42, 1 or 12%; and/or (vii) additional materials, such as up to approximately 5%, 0-4%, 0-13%, 2-13%, or 0-15% by weight of the homogenous moldable composition of natural earth fillers, for example, clays such as bentonite, amorphous raw products such as gypsum and calcium sulfate, minerals such as limestone, and man made materials such as fly-ash to form a homogeneous mixture;

c) adding to the pre-gelled starch suspension the dry or damp, homogeneous mixture to form a homogenous moldable composition;

(d) molding the homogenous moldable composition with heat to form a biodegradable container; and (e) coating the container with a liquid-resistant coating, such as PROTECOAT® (from New Coat, Inc.), ZEIN® (a biodegradable material isolated from corn); poly lactic acid (PLA, a polymer of lactic acid from fermentation feed stock); poly hydroxyalkanoates (PHA, from microbial fermentation); bacterial cellulose; chitosan based polymers (for example from shell fish wastes); or waxes and oil based coatings.

It is recognized that in any embodiment of the present invention, paper pulp can be substituted for wood fibers/flour.

In another embodiment, a process is provided for creating an open cell foam container by:

(a) forming a first pre-gelled starch suspension that is maintained at a low temperature, for example, preferably from 0-60° C., most preferably from 0-40° C.;

(b) mixing together wood fibers or flour (having an aspect ratio between approximately 1:2 and 1:8), a second pre-gelled starch suspension to form a homogeneous composition, and a source of gas, such as a source of carbon dioxide gas;

(c) adding to the first pre-gelled starch suspension a dry or damp, homogeneous mixture containing the wood fibers and second pre-gelled starch; and (d) molding the homogeneous composition with heat to form a biodegradable container.

In a specific embodiment, the present invention is directed to a process for forming an open cell foam container by:

(a) forming a pre-gelled starch suspension produced from approximately 3-5% potato starch (by weight of the pre-gel) and approximately 95-97% water (by weight of the pre-gel) such that the pre-gelled suspension is maintained at low temperatures, for example, between 0-60° C., preferably between 0-40° C.;

(b) mixing together wood fibers or flour (having an aspect ratio between approximately 1:2 and 1:8), a second pre-gelled starch suspension (the second pre-gel) produced from approximately 15% corn starch (by weight of the second pre-gel) and approximately 85% water (by weight of the second pre-gel), and baking powder, for example between 0.42-12% baking powder (by weight of the homogeneous moldable composition) to form a homogeneous mixture;

(c) adding to the pre-gelled potato starch suspension a homogeneous mixture containing the wood fibers and pre-gelled corn starch to form a homogeneous moldable composition; and (d) molding the homogeneous moldable composition with heat to form a biodegradable container.

The processes described herein will produce biodegradable containers that are formed from different combinations of materials by weight. For example, containers can be formed from approximately 16-61% pre-gelled potato starch suspension (by weight of the homogenous moldable composition) and approximately 11-37% (or 11-15%) wood fibers or flour (by weight of the homogenous moldable composition). In addition, various combinations of other materials can be added to the wood fibers or flour to produce a homogenous mixture before mixing it with the pre-gelled starch suspension, including, but not limited to:

(i) approximately 57-66% pre-gelled corn starch suspension (by weight of the homogenous moldable composition) (suspension formed from approximately 5-15% corn starch (by weight of the pre-gel) and approximately 85-95% water by weight of the pre-gel);

(ii) approximately 4-35% native starch (by weight of the homogenous moldable composition), for example 3-5% (preferably 3.7% or 4.2%) native potato starch, and/or 15.4-34.4% native corn starch;

(iii) approximately 1-5% glycerol (by weight of the homogenous moldable composition);

(iv) up to approximately 10 or 20% water (by weight of the homogenous moldable composition);

(v) approximately 0.1-15% baking powder (by weight of the homogenous moldable composition);

(vi) less than approximately 5% natural materials (by weight of the homogenous moldable composition), such as bentonite clay.

DETAILED DESCRIPTION OF THE INVENTION

Definitions

The term "sheet" as used herein refers to any substantially flat, corrugated, curved, bent, or textured sheet made using the methods described herein. The sheets can also include organic coatings, printing, other sheets laminated thereto. The sheets within the scope of the present invention can have greatly varying thicknesses depending on the particular applications for which the sheets are intended. The sheets can be as thin as about 0.001 mm or as thick as 1 cm or greater where strength, durability, and or bulk are important considerations.

The term "film" is not inherently different from the term "sheet" except that "film" normally denotes a very thin sheet. Films are often formed by processes that are different from how sheets are normally formed, such as by film blowing rather than sheet calendering. In general, films will be defined as sheet-like articles having thicknesses as low as about 1 micron and up to about 1 mm.

The term "molded article" shall refer to articles that are shaped directly or indirectly from starch compositions using any molding method known in the art.

The term "container" as used in this specification and the appended claims is intended to include any article, receptacle, or vessel utilized for storing, dispensing packaging portioning, or shipping various types of products or objects (including, but not limited to, food and beverage products). Specific examples of such containers include, among others, boxes, cups, "clam shells," jars, bottles, plates, bowls, trays, cartons, cases, crates, cereal boxes, frozen food boxes, milk cartons, bags, sacks, carriers for beverage containers, dishes, egg cartons, lids, straws, envelopes, or other types of holders. In addition to integrally formed containers, containment products used in conjunction with containers are also intended to be included within the definition "container". Such articles include, for example, lids, liners, straws, partitions, wrappers, cushioning materials, utensils, and any other product used in packaging, storing, shipping, portioning, serving, or dispensing an object within a container.

As used herein, the term "dry or damp" refers to a solid composition that can be dry, or can be moist or wetted, generally with water, although other solvents may be used. The amount of liquid in the composition is not sufficient to act as a carrier between particles in the composition.

As used herein, the term "homogeneous mixture" refers to mixtures of solid particulates or of solids in a liquid carrier which are substantially uniform in composition on a macroscopic scale. It will be appreciated that mixtures of different types of solid particles or of solids in a liquid carrier are not homogeneous when viewed on a microscopic scale, i.e., as the particle size level.

Pre-Gelled Starch Suspensions

The starch component can include any known starch material, including one or more unmodified starches, modified starches, and starch derivatives. Preferred starches can include most any unmodified starch that is initially in a native state as a granular solid and which will form a thermoplastic melt by mixing and heating. Starch is typically considered a natural carbohydrate chain comprising polymerized glucose molecules in an alpha-(1,4) linkage and is found in nature in the form of granules. Such granules are easily liberated from the plant materials by known processes. Starches used in forming the pre-gelled starch suspension used in the method of the invention desirably possess the following properties: the ability to form hydrated gels and to maintain this gel structure in the presence of many types of other materials; and the ability to melt into plastic-like materials at low temperatures, for example, between 0-75° C., preferably between 0-65° C., and in the presence of a wide range of materials and in moist environments and to exhibit high binding strengths and produce an open cell structure for both insulation and cross linking of components. The preferred sources of starch for pregels are cereal grains (e.g., corn, waxy corn, wheat, sorghum, rice, and waxy rice, which can also be used in the flour and cracked state), tubers (potato), roots (tapioca (i.e., cassava and maniac), sweet potato, and arrowroot), modified corn starch, and the pith of the sago palm.

While not intending to be bound to any specific mechanistic explanation for the desirable properties observed when the method of the invention is employed, it is believed that the gel property holds other components in suspension until the product can be molded and to hold the moisture levels constant within the mixture until and during molding. The second property is evident in the transition in the mold of the gel structure into a drier and dried form that will then melt into the binding plastic-like product within the confines of the mold. This complex three dimensional cross linked structure is the backbone for the product, exhibiting both strength and insulation properties. The pre-gelled starch is prepared by mixing the starch with water (for example at levels of approximately 2% to 15% by weight of the pre-gel, preferably at least 2.5%, 3%, 5%, 10%, or 15%) at about ambient temperature (approximately 25° C.). The gel is formed by slowly heating the water-starch mixture with constant agitation until a gel forms. Continued heating will slowly degrade the gel, so the process should be stopped as soon as an appropriate level of gelation is achieved. Gels can be used cold. The gel is stable for a few days if refrigerated. For storage a biocide can be added, preferably at a concentration of about 10 to about 500 ppm.

Preferred starch-based binders are those that gelate and produce a high viscosity at a relatively low temperature. For example, potato starch quickly gelates and reaches a maximum viscosity at about 65° C. The viscosity then decreases, reaching a minimum at about 95° C. Wheat starch acts in a similar fashion and can also be used. Such starch-based binders are valuable in producing thin-walled articles having a smooth surface and a skin with sufficient thickness and density to impart the desired mechanical properties.

In general, starch granules are insoluble in cold water; however, if the outer membrane has been broken by, e.g., by grinding, the granules can swell in cold water to form a gel. When the intact granules are treated with warm water, the granules swell and a portion of the soluble starch diffuses through the granule wall to form a paste. In hot water, the granules swell to such an extent that they burst, resulting in gelation of the mixture. The exact temperature at which a starch swells and gelates depends on the type of starch. Gelation is a result of the linear amylose polymers, which are initially compressed within the granules, stretching out and cross-linking with each other and with the amylopectin. After the water is removed, the resulting mesh of inter-connected polymer chains forms a solid material that can have a tensile strength up to about 40-50 MPa. The amylose polymers can also be used to bind individual aggregate particles and fibers within the moldable mixture.

It is possible to reduce the amount of water in starch melts by replacing the water inherently found in starch with an appropriate low volatile plasticizer capable of causing starch to melt below its decomposition temperature, such as glycerin, polyalkylene oxides, mono- and diacetates of glycerin, sorbitol, other sugar alcohols, and citrates. This can allow for improved processability, greater mechanical strength, better dimensional stability over time, and greater ease in blending the starch melt with other polymers.

Water can be removed before processing by using starch that has been pre-dried so as to remove at least a portion of the natural water content. Alternatively, water can removed during processing by degassing or venting the molten mixture, such as by means of an extruder equipped with venting or degassing means. Native starch can also initially be blended with a small quantity of water and glycerin in order to form starch melts that are subjected to a degassing procedure prior to cooling and solidification in order to remove substantially all of the water therefrom.

In one aspect of the present invention, the pre-gelled starch suspension is produced from approximately 3-10%, preferably, 3, 5, 7.5 or 10%, starch by weight of the pre-gel, preferably, potato starch, and 90-97% water by weight of the pre-gel such that the pre-gelled suspension is maintained at low temperatures. In one embodiment, the pregeled starch solution can be maintained at all temperatures above freezing, 0° C. In another embodiment, the pregelled starch solution can be maintained for greater that 24 hours, up to a few days, if stored refrigerated, for example, between 3-15° C.

In another aspect of the present invention, a pre-gelled paper starch suspension is produced from approximately 5-15%, preferably 10%, starch (by weight of the pre-gel), preferably potato starch; 5-10% paper pulp (by weight of the pre-gel), preferably 5.9-8%, more preferably, 7.3-7.5, 6.5-6.7, or 5.9-6.1%; and 75-92.5% water (by weight of the pre-gel), such that the pre-gelled suspension is maintained at low temperatures. In one embodiment, the pregelled paper starch solution can be maintained at all temperatures above freezing, 0° C. In another embodiment, the pregelled paper starch solution can be maintatined for greater that 24 hours, up to a few days, if stored refrigerated, for example, between 3-15° C.

Paper Pulp

In one aspect of this invention, prepulped paper is mixed with the pregel. The preferred amount of paper pulp added is in the range of 5-10% by weight of the pre-gel, preferably 5.9-8%, more preferably, 7.3-7.5, 6.5-6.7, or 5.9-6.1%. The prepulped paper can be mixed with 5-15%, preferably 10% potato or other natural starch (such as corn starch), and 75-90% water, for example, 580 gm water, 57.5 gm dry potato starch, and 42.31 gm paper pulp. The mixture is stirred at slow rpm while increasing the temperature to 60-70° C., after which premixed dry ingredients (wood flour (preferably 5-10% (w/w) with an aspect ratio of 1:8; 1:9.9; 1:9 or 1:5), native potato starch (preferably 10-15% (by weight)) and/or native corn starch (preferably 10-20% (by weight)) can be added.

Paper pulp for this invention can be produced by any method known in the art. Paper pulp is a fibrous material produced by mechanically or chemically reducing woody plants into their component parts from which, pulp, paper and paperboard sheets are formed after proper slushing and treatment, or used for dissolving purposes (Lavigne, J R "Pulp & Paper Dictionary" 1993: Miller Freeman Books, San Francisco). Cellulose pulp production is a process that utilizes mainly arboreal species from specialized cultivations. To produce the paper pulp, wood, typically reduced to dimensions of about 30-40 mm and a thickness of about 5-7 mm, is treated at high temperature and pressure with suitable mixes of chemical reagents that selectively attack lignin and hemicellulose macromolecules, rendering them soluble. Pulps coming from this first treatment, commonly called "cooking", are called "raw pulps"; they still contain partly modified lignin and are more or less Havana-brown colored. Raw pulps can be submitted to further chemical-physical treatments suitable to eliminate almost entire lignin molecules and colored molecules in general; this second operation is commonly referred to as "bleaching". For this process, rapid growth ligneous plants are mainly used, which, with the help of chemical substances (alkali or acids), in condition of high pressure and temperature, are selectively delignified to obtain pulps containing cellulose and other components of lignocellulose. These pulps are then submitted to mechanical and chemical-physical treatments, in order to complete the removal of lignin and hemicellulose residual components, and utilized thereafter for paper production. Any of form of paper pulp can be used in the packaging materials described herein.

Dry or Damp Starch

After formation of a pregel, dry or damp materials can be added (such as fibers, flour, pulp, or dry starches) to produce the final moldable mixture. The dry or damp materials can be pre-mixed before addition to the pregel, to increase the homogeneity of the final product and increase the structural integrity of the final molded product. Preferably, the amount of pregel added to the final mixture is in the range of about 7-60% by weight of the homogenous moldable composition. Preferably, the pregel is about at least 7%, 8%, 9%, 10%, 11%, 12%, 16.3%, 25%, 33%, 42%, 47%, 54%, 50%, 52%, 55%, 56%, 60% or 60.4% by weight of the homogenous moldable composition.

One component in the dry/damp material that can be added to the pre-gelled starch is a dry or damp starch binder component. This starch can be corn or other dry starch (for example potato, rice or wheat starch). Pre-gelatinized starch-based binders can also be added to the moldable mixture. Pregelatinized starch-based binders are starches that have previously been gelated, dried, and ground back into a powder. Since pre-gelatinized starch-based binders gelate in cold water, such starch-based binders can be added to the moldable mixture to increase the mixture viscosity prior to being heated. The increased viscosity prevents settling and helps produce thicker cell walls. This starch component can be pre-gelled in a manner similar to that describes above. For example, the second starch component can be pregelled in a mixture of between about 1 and 15% starch (for example 15% corn starch) and 85-99% water. In these cases additional dry starch can be added as necessary to the homogeneous mixture to adsorb excess water. If the pregelled second starch is still damp, the preferred amount to be added is in the range of 55-65% by weight of the homogenous moldable composition, most preferably about 57% or about 65%.

The concentration of the native starch binder within the moldable mixtures of the present invention are preferably in a range from about 5% to about 60% by weight of the homogenous moldable composition, more preferably in a range from about 15% to about 30%, and most preferably about at least 6%, 20%, 21%, 25%, 26%, 27%, 28%, 29%, 30%, 31%, or 34% by weight of the homogenous moldable composition. Furthermore, combinations of different starches can be employed to more carefully control the viscosity of the mixture throughout a range of temperatures, as well as to affect the structural properties of the final hardened article. For example, the mixture can consist of a mixture of dry or damp corn and potato starch (16-44% of corn and potato starch by weight of the homogenous moldable composition), such that the corn starch comprises between about 13-30%, preferably between about 13-18% or 28-30%, and the potato starch comprises between about 3-14%, preferably approximately 1-14% or 3-5% of the final homogenous moldable composition.

Starch is produced in many plants, and many starches can be suitable, however, as with the starch used in the pre-gel, preferred sources of starches are seeds of cereal grains (e.g., corn, waxy corn, wheat, sorghum, rice, and waxy rice), which can be used in the flour and cracked state. Other sources of starch include tubers (potato), roots (tapioca (i.e., cassava and maniac), sweet potato, and arrowroot), and the pith of the sago palm. The starch can be selected from natural starch, chemically and/or physically modified starch, biotechnologically produced and/or genetically modified starch and mixtures thereof.

Suitable starches can also be selected from the following: ahipa, apio (arracacha), arrowhead (arrowroot, Chinese potato, jicama), baddo, bitter casava, Brazilian arrowroot, casava (yucca), Chinese artichoke (crosne), Japanese artichoke (chorogi), Chinese water chestnut, coco, cocoyam, dasheen, eddo, elephant's ear, girasole, goo, Japanese potato, Jerusalem artichoke (sunroot, girasole), lily root, ling gaw, malanga (tanier), plantain, sweet potato, mandioca, manioc, Mexican potato, Mexican yarn bean, old cocoyam, saa got, sato-imo, seegoo, sunchoke, sunroot, sweet casava, tanier, tannia, tannier, tapioca root, taro, topinambour, water chestnut, water lily root, yam bean, yam, yautia, barley, corn, sorghum, rice, wheat, oats, buckwheat, rye, kamut brand wheat, triticale, spelt, amaranth, black quinoa, hie, millet, plantago seed husks, psyllium seed husks, quinoa flakes, quinoa, teff.

Starches that can be used for the present invention include unmodified starches (armylose and amylopectin) and modified starches. By modified, it is meant that the starch can be derivatized or modified by typical processes known in the art such as, e.g. esterification, etherification, oxidation, acid hydrolysis, cross-linking, and enzyme conversion. Typical modified starches include esters, such as the acetate and, the half-esters of dicarboxylic acids/anhydrides, particularly the alkenylsuccinic acids/anhydrides; ethers, such as the hydroxyethyl and hydroxypropyl starches; oxidized starches, such as those oxidized with hypochlorite; starches reacted with cross-linking agents, such as phosphorus oxychloride, epichlorohydrin, hydrophobic cationic epoxides, and phosphate derivatives prepared by reaction with sodium or potassium orthophosphate or tripolyphosphate, and combinations thereof. Modified starches also include seagel, long-chain alkylstarches, dextrins, amine starches, and dialdehyde starches. Unmodified starch-based binders are generally preferred over modified starch-based binders because they are significantly less expensive and produce comparable articles.

The dry ingredients, such as corn starch and wood flour are preferably pre-mixed into a homogeneous mixture before being added to the pregel. The dry/damp starch and the wood flour or fibers can be mixed to form a homogeneous mixture using any suitable means, such as, for example, a Kitchen Aid® Commercial Mixer.

Wood Flour or Fibers

In the present invention, additional fibers can be employed as part of the dry/damp material added to the pre-gelled starch. The fibers used are preferably organic, and most preferably cellulose-based materials, which are chemically similar to starches in that they comprise polymerized glucose molecules. "Cellulosic fibers" refers to fibers of any type which contain cellulose or consist of cellulose. Plant fibers preferred here are those of differing lengths typically in the range from 600 micron to 3000 micron, principally from hemp, cotton, plant leaves, sisal, abaca, bagasse, wood (both hard wood or soft wood, examples of which include southern hardwood and southern pine, respectively), or stems, or inorganic fibers made from glass, graphite, silica, ceramic, or metal materials. The cellulosic fibers include wood fibers and wood flour. In one embodiment, 11-24% by weight of wood fibers or flour are added to the final mixture. In the preferred embodiments, wood fibers or flour comprise about at least 11%, 12%, 13%, 14%, 16%, 17%, and 23.3% by weight of the homogenous moldable composition.

Wood flour and fibers are very much like rough tooth picks that have small barb like structures coming out from the main fiber to participate in the cross linkage process with the cooling starch melt. This property adds both strength and water resistance to the surface produced within the mold. The rapid grinding process to produce flour or short fibers by-passes the expensive and polluting processes that are used to manufacture pulp and paper. The wood flour can be a resinous wood flour. Preferably, the wood flour is softwood flour, which contains relatively large amounts of resin. Moreover, softwood is used industrially on a large scale, such as in the building trade, with the consequence that an abundance of wood flour from, for instance, saw mills, is available at a low price. Wood flours can be graded based on the mesh size the flour. In general, wood flour having a mesh size of 20-100 is suitable, and an aspect ratio or 1:8 or 1:9, or 1:10 or less.

Larger particles are considered to be fibers. The expression "fibers" refers to fine, thin objects restricted in their length, the length being greater than the width. They can be present as individual fibers or as fiber bundles. Such fibers can be produced in a manner known to those skilled in the art. Preferred fibers have a low length to diameter ratio and produce materials of excellent strength and light weight. In general, the fibers used in the invention will have an aspect ration of about between 1:2 and 1:10; 1:2 and 1:9; 1:2 and 1:8; 1:2 and 1:7; 1:2 and 1:6; 1:2 and 1:5; 1:2 and 1:4; 1:2 and 1:3; 1:2 and 1:2; or 1:2 and 1:9.9.

It should also be understood that some fibers, such as southern pine and abaca, have high tear and burst strengths, while others, such as cotton, have lower strength but greater flexibility. In the case where better placement, higher flexibility, and higher tear and burst strength are desired, a combination of fibers having varying aspect ratios and strength properties can be added to the mixture.

In a additional aspect of the present invention, it is recognized that to decrease the residual odor of the wood in the final product, the amount of paper pulp can be increased to 50%, or 30-50%, by weight of the final mixture, and the amount of wood flour or fiber can be decreased to 0%.

Additional Materials

In addition to the dry/damp starch and the wood flour, the homogenous mixture can also include one or more additional materials depending on desired characteristics of the final product. Natural earth fillers can be included for a stronger product. Suitable fillers include but are not limited to clays such as bentonite, amorphous raw products such as gypsum (calcium sulfate dehydrate) and calcium sulfate, minerals such as limestone and man made materials such as fly ash. These natural earth fillers are able to take part in the cross linking and binding that occurs during the molding process. Other examples of useful fillers include perlite, vermiculite, sand, gravel, rock, limestone, sandstone, glass beads, aerogel, xerogels, seagel, mica, clay, synthetic clay, alumina, silica, fused silica, tabular alumina, kaolin, microspheres, hollow glass spheres, porous ceramic spheres, calcium carbonate, calcium aluminate, lightweight polymers, xonotlite (a crystalline calcium silicate gel), lightweight expanded clays, hydrated or unhydrated hydraulic cement particles, pumice, exfoliated rock, and other geologic materials. Partially hydrated and hydrated cement, as well as silica fume, have a high surface area and give excellent benefits such as high initial cohesiveness of the freshly formed article. Even discarded inorganically filled materials, such as discarded containers or other articles of the present invention can be employed as aggregate fillers and strengtheners. It will also be appreciated that the containers and other articles of the present invention can be easily and effectively recycled by simply adding them to fresh moldable mixtures as an aggregate filler. Hydraulic cement can also be added in either its hydrated or unhydrated form. Both clay and gypsum can be important aggregate materials because they are readily available, relatively inexpensive, workable, form easily, and can also provide a degree of binding and strength if added in high enough amounts (for example in the case of gypsum hemihydrate). Because gypsum hemihydrate can react with the water within the moldable mixture, it can be employed as a means for holding water internally within the molded article. Preferably, the inorganic materials are added in an amount from up to approximately 5%, 0-4%, 0-13%, 2-13% or 0-15% by weight of the weight of the final composition.

Because of the wide variety of agents that can be used as fillers, preferred concentration ranges are difficult to calculate. For bentonite clay a preferred range is from about 2.5-4% of the weight of the final mixture. The additional agents can be predisolved or can be added dry. A preferred clay slurry is 20% bentonite clay in water.

In addition, further cellulose-based thickening agents can be added, which can include a wide variety of cellulosic ethers, such as methylhydroxyethylcellulose, hydroxywethylethylcellulose, carboxymethylcellulose, methylcellulose, ethylcellulose, hydroxyethylcellulose, hydroxyethylpropylcellulose, hydroxypropylmethylcellulose, and the like. Other natural polysaccharide-based thickening agents include, for example, alginic acid; phycocolloids, agar, gum arabic, guar gum, locust bean gum, gum karaya, xanthan gum, and gum tragacanth. Suitable protein-based thickening agents include, for example, ZEIN® (a prolamine derived from corn), collagen (derivatives extracted from animal connective tissue such as gelatin and glue), and casein (derived from cow's milk). Suitable synthetic organic thickening agents include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylamides, ethylene oxide polymers, polylactic acid, and latex. Latex is a broad category that includes a variety of polymerizable substances formed in a water emulsion. An example is styrene-butadiene copolymer. Additional copolymers include: vinyl acetate, acrylate copolymers, butadiene copolymers with styrene and acetonitrile, methylacrylates, vinyl chloride, acrylamide, fluorinated ethylenes. Hydrophilic monomers can be selected from the following group: N-(2-hydroxypropyl)methacrylamide, N-isopropyl acrylamide, N,N-diethylacryl-amide, N-ethylmnethacrylamide, 2-hydroxyethyl methacrylate, acrylic acid 2-(2-hydroxyethoxy)ethyl methacrylate, methacrylic acid, and others, and can be used for the preparation of hydrolytically degradable polymeric gels. Suitable hydrophobic monomers can be selected from the 2-acetoxyethyl methacrylate group of monomers comprising dimethylaminoethyl methacrylate, n-butyl methacrylate, tert-butylacrylamide, n-butyl acrylate, methyl methacrylate, and hexyl acrylate. The polymerization can be carried out in solvents, e.g. in dimethylsulfoxide, dimethylformamide, water, alcohols as methanol and ethanol, using common initiators of the radical polymerization. The hydrophilic gels are stable in an acidic environment at pH 1-5. Under neutral or weak alkaline conditions at pH above 6.5, the gels degrade. The gels mentioned above are nontoxic as well as the products of their biodegradation.

Other copolymers include: aliphatic polyester, polycaprolactone, poly-3-hydroxybutyric acid, poly-3-hydroxyvaleric acid, polyglycolic acid, copolymers of glycolic acid and lactic acid, and polylactide, PVS, SAN, ABS, phenoxy, polycarbonate, nitrocellulose, polyvinylidene chloride, a styrene/allyl alcohol copolymer, polyethylene, polypropylene, natural rubber, a sytrene/butadiene elastomer and block copolymer, polyvinylacetate, polybutadiene, ethylene/propylene rubber, starch, and thermoplastic segmented polyurethane, homopolymers on copolymers of polyesters, polyorthoesters, polylactides, polyglycolides, polycaprolactones, polyhydroxybutyrates, polyhydroxyvalerates, porno acids, pseudopolyamino acids, polyamides and polyanhydrides, homopolymers and copolymers of polylactic acid, polyglygyolic acid, polycaprolactone (PCL), polyanhydrides, polyorthoesters, polyaminoacids, pseudopolyaminoacids, polyhydroxybutyrates, polyhydroxyvalerates, polyphophazenes, and polyalkylcyanoacrylates.

Additional polymers that can be added include: citrates, diethyl citrate (DEC), triethyl citrate (TEC), acetyl triethyl citrate (ATEC), tributyl citrate (TBC), acetyl tributyl citrate (ATBC), phthalates such as dimethyl phthalate (DMP), diethyl phthalate (DEP), triethyl phthalate (TEP), dibutyl phthalate (DBP), dioctyl phthalate, glycol ethers such as ethylene glycol diethyl ether, propylene glycol monomethyl ether, ethylene glycol monoethyl ether, diethylene glycol monoethyl ether (Transcutol™), propylene glycol monotertiary butyl ether, dipropylene glycol monomethyl ether, n-methylpyrrolidone, 2 pyrrolidone (2-Pyrrol™), propylene glycol, glycerol, glyceryl dioleate, ethyl oleate, benzylbenzoate, glycofurol sorbitol sucrose acetate isobutyrate, butyryltri-n-hexyl-citrate, acetyltri-n-hexyl citrate, sebacates such as dibutyl sebacate, tributyl sebacate, dipropylene glycol methyl ether acetate (DPM acetate), propylene carbonate, propylene glycol laurate, propylene glycol caprylate/caprate, caprylic/capric triglyceride, gamma butyrolactone, polyethylene glycols (PEG), glycerol and PEG esters of acids and fatty acids (Gelucires™, Labrafils™ and Labrasol™) such as PEG-6 glycerol mono oleate, PEG-6 glycerol linoleate, PEG-8 glycerol linoleate, PEG-4 glyceryl caprylatecaprate, PEG-8 glyceryl caprylate/caprate, polyglyceryl-3-oleate, polyglyceryl-6-dioleate, polyglyceryl-3-isostearate, PEG-32 glyceryl laurate (Gelucire 44/1 ™), PEG-32 glyceryl palmitostearate (Gelucire 50/13™), PEG-32 glyceryl stearate (Gelucire 53/10™), glyceryl behenate, cetyl palmitate, glyceryl di and tri stearate, glyceryl palmitostearate, and glyceryl triacetate (Triacetin™), vegetable oils obtained from seeds, flowers, fruits, leaves, stem or any part of a plant or tree including cotton seed oil, soy bean oil almond oil, sunflower oil, peanut oil, sesame oil. The use of two or more plasticizers in a combination or blend of varying ratios and hydrophilicity or hydrophobicity is also encompassed by the present invention. Plasticizers also include: phthalates, glycol ethers, n-methylpyrrolidone, 2 pyrrolidone, propylene glycol, glycerol, glyceryl dioleate, ethyl oleate, benzylbenzoate, glycofurol sorbitol, sucrose acetate isobutyrate, butyryltri-n-hexyl-citrate, acetyltri-n-hexyl citrate, sebacates, dipropylene glycol methyl ether acetate (DPM acetate), propylene, carbonate, propylene glycol laurate, propylene glycol caprylate/caprate, caprylic/capric triglyceride, gamma butyrolactone, polyethylene glycols (PECs), vegetable oils obtained from seeds, flowers, fruits leaves, stem or any part of a plant or tree including cotton seed oil, soy bean oil, almond oil, sunflower oil peanut oil, sesame oil, glycerol and PEG esters of acids and fatty acids, polyglyceryl-3-oleate, polyglyceryl-6-dioleate, polyglyceryl-3-isostearate, PEG-32 glyceryl laurate, PEG-32 glyceryl palmitostearate, PEG-32 glyceryl stearate, glyceryl behenate, cetyl palmitate, glyceryl di and tri stearate, glyceryl palmitostearate, and glyceryl triacetate. These materials can also be added in combination with other polymers to improve flexibility.

The addition of these items will increase the efficiency of production of the product on an item basis. Baking powder and other materials, such as leavening agents, which release gases, (e.g., sodium or calcium bicarbonates or carbonates) can be included in the compositions of the invention to elevate the number of open cells in the final structure by introducing a source of carbon dioxide gas which is released in the mold.

Glycerol, microcrystalline wax, fatty alcohols and other similar organic molecules can be added as a mold release agent, and to produce a smoother surface on the finished product Examples of agents that can be added, either as plasticizers or as mold releasing agents are ethylene glycol, propylene glycol, glycerin, 1,3-propanediol, 1,2-butandiol, 1,3-butandiol, 1,4-butanediol, 1,5-pentandiol, 1,5-bexandiol, 1,6-hexandiol, 1,2,6-hexantriol, 1,3,5-hexantriol,neopentylglycol, sorbitol acetate, sorbitol diacetate, sorbitol monoethoxylate, sorbitol diethoxylate, sorbitol hexaethoxylate, sorbitol dipropoxylate, arrunosorbitol, trihydroxymethylaminomethane, glucose/PEG, the reaction product of ethylene oxidewith glucose, trimethylolpropane monoethoxylate, mannitol monoacetate, mannitol monoethoxylate, butyl glucoside, glucose monoethoxylate, a-methyl glucoside, the sodium salt of carboxymethylsorbitol, polyglycerol monoethoxylate, erythritol, pentaerythritoi, arabitol, adonitol, xylitol, mannitol, iditol, galactitl, ailitol, sorbitol, polyhydric alcohols generally, esters of glycerin, formamide, N-methylformamide, DMSO, mono- and diglycerides, alkylarruides, polyols, trimethylolpropane, polyvinylalcohol with from 3 to 20 repeating units, polyglycerols with from 2 to 10 repeating units, and derivatives of the foregoing. Examples of derivatives include ethers, thiethers, inorganic and organic esters, acetals, oxidation products, amides, and amines. These agents can be added from 0-10%, preferably 3-4% (w/w). A consideration of the inventive mixture should be that the composition preferably contains at least 75%, more preferably at least 95% of natural or organic-derived materials by weight of the homogenous moldable composition, Preparation of Molded Articles The starch-wood flour mixture, with any included additives, is added to the pre-gelled starch and mixed (for example with a Kitchen Aid Commercial Mixer) until a homogeneous mixture is generated. The mixture can be as thick as peanut butter or as thin as a pancake batter. Varying amounts of additional water can by added to facilitate different types of molding, since the form of the pre-molded [green] product is dependent on the mold, heating rate and drying/melt time. If the product is to be molded by classic injection methods the material is thinner, if the material is molded on the equipment described below the mixture is thicker. The material can also be rolled into green sheets and molded, extruded and made into dry pellets for other processes. The means of production for the product could be created from any of several possible process approaches. One specific methodology is described below, but this description is intended only to describe one possible means of production, and shall not be construed in any way to represent a limitation to the outlined approach. While the compression molding process detailed herein is useful, other types of compression molding, injection molding, extrusion, casting, pneumatic shaping, vacuum molding, etc can be used. One embodiment involves a means of production incorporating moving upper and lower continuous track assemblies each with an upper and lower substantially elongated horizontal section, and with a curved portion of track joining the upper and lower horizontal section for each of the upper and lower tracks. Riding in each of the track assemblies is a linked belt made from any material or combination of materials that allows the belt or belt assembly to be in constant or intermittent motion about the tracks. The track assemblies are located vertically such that the upper portion of the lower track and the lower portion of the upper track are in close proximity such that the belts of each track move at a synchronized speed and in a common direction, in this embodiment, the male mold portion is mounted to the belt following the upper track, and the female portion of the mold is mounted to the belt following the lower track, with the tracks synchronized in a fashion that causes the mold halves to join and close as they merge between the upper and lower tracks. In this embodiment, the material to be processed is deposited into the female mold half prior to the mold haves closing, or is injected into the mold after it has been closed. The track and belt assemblies hold the mold halves together during drying by any of a number of, or combination of, methods including without limitation spring force, pneumatic force, or mechanical compression. Other forcing methods are possible. One possible arrangement of the curved end of the tracks aligns them such that the lower tracks' upper horizontal section are located to start before the upper tracks' lower horizontal section to allow the female mold half on the upper section of the lower track to assume a substantially horizontal orientation prior to the male mold half attached to upper track, thereby allowing the female mold half to receive deposited material before it engages the corresponding male mold half merging from the upper track and belt assembly. Other aspects that can be incorporated in this embodiment include, removable cavity inserts and or multiple cavities in the molds: heating of the molds or product to speed drying by electric, microwave, hot gas, friction, ultrasonic, or any other means: on the fly cleaning of the molds, on the fly coating of product with any of a number of coating agents.

In another embodiment, once the moldable mixture has been prepared, it is positioned within a heated mold cavity. The heated mold cavity can comprise many different embodiments, including molds typically used in conventional injection molding processes and die-press molds brought together after placing the inorganically filled mixture into the female mold. In one preferred embodiment, for example, the moldable mixture is placed inside a heated female mold. Thereafter, a heated male mold is complementarily mated with the heated female mold, thereby positioning the mixture between the molds. As the mixture is heated, the starch-based binder gelates, increasing the viscosity of the mixture. Simultaneously, the mixture increases in volume within the heated molds cavity as a result of the formation of gas bubbles from the evaporating solvent, which are initially trapped within the viscous matrix. By selectively controlling the thermodynamic parameters applied to the mixture (e.g., pressure, temperature, and time), as well as the viscosity and solvent content, the mixture can be formed into a form-stable article having a selectively designed cellular structural matrix.

In a non-limiting embodiment, a temperature between 195-225° C., preferably 200° C. is used for baking for a time period of 60-90 seconds, preferably 75 seconds. Temperatures can vary based on the article bring manufactured, for example, 200° C. is preferred for the rapid production of thin-walled articles, such as cups. Thicker articles require a longer time to remove the solvent and are preferably heated at lower temperatures to reduce the propensity of burning the starch-based binder and fiber. Leaving the articles within the locked molds too long can also result in cracking or deformation of the articles.

The temperature of the mold can also effect the surface texture of the molds. Once the outside skin is formed, the solvent remaining within the interior section of the mixture escapes by passing through minute openings in the outside skin and then traveling between the skin and the mold surface to the vent holes. If one mold is hotter than the other, the laws of thermodynamics would predict, and it has been empirically found, that the steam will tend to travel to the cooler mold. As a result, the surface of the article against the hotter mold will have a smoother and more uniform surface than the surface against the cooler mold.

A variety of articles can be produced from the processes and compositions of the present invention. The terms "article" and "article of manufacture" as used herein are intended to include all goods that can be formed using the disclosed process.

Coating of Molded Article

Before, during, or after any of the molding processes, coatings can be applied to the surface of a substantially dried article for any desired purpose, such as to make the article more waterproof, grease and food product proof, more flexible, or to give it a glossier surface. Coatings can be used to alter the surface characteristics including sealing and protecting the article made therefrom. Coatings can provide protection against moisture, base, acid, grease, and organic solvents. They can provide a smoother, glossier, or scuff-resistant surface, they can help reinforce the article and coatings can also provide reflective, electrically conductive or insulative properties.

Water resistance can be achieved through the use of a water resistant layer applied on one or both sides of the product. There are many currently available coatings that can be used to coat this product. Some of these are: PROTECOAT® 6616B by New Coat, Inc.; ZEIN® a biodegradable material isolated from corn; poly lactic acid [PLA]—a polymer of lactic acid from fermentation feed stock; polyhydroxyalkanoates [PHA] from microbial fermentation; bacterial cellulose; chitosan based polymers—from shell fish wastes; natural waxes and oil based coatings.

Appropriate organic coatings include edible oils, melamine, polyvinyl chloride, polyvinyl alcohol, polyvinyl acetate, polyacrylates, polyamides, hydroxypropylmethylcellulose, polyethylene glycol, acrylics, polyurethane, polyethylene, polylactic acid, Biopol™ (a polyhydroxybutyrate-hydroxyvalerate copolymer), starches, soybean protein, polyethylene, and synthetic polymers including biodegradable polymers, waxes (such as beeswax or petroleum based wax), elastomers, edible oils, fatty alcohols, phospholipids and other high molecular weight biochemicals, and mixtures or derivatives thereof. Biopol® is manufactured by ICI in the United Kingdom. Elastomer, plastic, or paper coatings can aid in preserving the integrity of the article. Appropriate inorganic coatings include sodium silicate, calcium carbonate, aluminum oxide, silicon oxide, kaolin, clay, ceramic and mixtures thereof. The inorganic coatings can also be mixed with one or more of the organic coatings set forth above. Coatings based upon materials such as soybean oil or Methocel®. (available from Dow Chemical), either alone or in combination with polyethylene glycol, can be applied to the surface in order to permanently soften the article or a hinge area within the article.

The coating can be applied either during the forming process or after the article is formed. The coating can be formed during the forming process by adding a coating material that has approximately the same melting temperature as the peak temperature of the mixture. As the mixture is heated, the coating material melts and moves with the vaporized solvent to the surface of the article where it coats the surface.

The coatings can be applied to the shaped articles using any coating means known in the art of manufacturing paper, paperboard plastic, polystyrene, sheet metal, or other packaging materials, including blade, puddle, air-knife, printing, Dahlgren, gravure, and powder coating, Coatings can also be applied by spraying the article with any of the coating materials listed below or by dipping the article into a vat containing an appropriate coating material. These materials can be applied either as a thin film or can be sprayed/dipped onto the product. The apparatus used for coating will depend on the shape of the article. For example, cups will usually be coated differently than flat plates. Bonding processes for application of thin films of water-resistant material are known in the art. Each of these coatings are biodegradable and should not significantly impact the compostability of the product. The second method of improving the water resistance of the product is to add one or more biodegradable materials to the material either before molding or as part of the molding process. In each of these cases the basic composition of the product will remain fairly constant.

A waterproof coating is desirable for articles intended to be in contact with water. As the articles having a starch-based binder have a high affinity for water, the preferred coatings are non-aqueous and have a low polarity. Appropriate coatings include paraffin (synthetic wax); shellac; xylene-formaldehyde resins condensed with 4,4'-isopropylidenediphenolepichlorohydrin epoxy resins; drying oils; reconstituted oils from triglycerides or fatty acids from the drying oils to form esters with various glycols (butylene gylcol, ethylene glycol), sorbitol, and trimethylol ethane or propane; synthetic drying oils including polybutadiene resin; natural fossil resins including copal (tropical tree resins, fossil and modern), damar, elemi, gilsonite (a black, shiny asphaltitc, soluble in turpentine), glycol ester of damar, copal, elemi, and sandarac (a brittle, faintly aromatic translucent resin derived from the sandarac pine of Africa), shellac, Utah coal resin; rosins and rosin derivatives including rosin (gum rosin, tall oil rosin, and wood rosin), rosin esters formed by reaction with specific glycols or alcohols, rosin esters formed by reaction formaldehydes, and rosin salts (calcium resinate and zinc resinate); phenolic resins formed by reaction of phenols with formaldehyde; polyester resins; epoxy resins, catalysts, and adjuncts; coumrarone-indene resin; petroleum hydrocarbon resin (cyclopentadiene type); terpene resins; urea-formaldehyde resins and their curing catalyst; triazine-formaldehyde resins and their curing catalyst; modifiers (for oils and alkyds, including polyesters); vinyl resinous substances (polyvinyl chloride, polyvinyl acetate, polyvinyl alcohol, etc.); cellulosic materials (carboxymethylcellulose, cellulose acetate, etlhhydroxyethylcellulose, etc.); styrene polymers; polyethylene and its copolymers; acrylics and their copolymers; methyl methacrylate; ethyl methacrylate; waxes (paraffin type I, paraffin type II, polyethylene, sperm oil, bees, and spermaceti); melamine; polyamides; polylactic acid; Biopol® (a polyhydroxybutyrate-hydroxyvalerate copolymer); soybean protein; other synthetic polymers including biodegradable polymers; and elastomers and mixtures thereof. Biopol® is manufactured by ICI in the United Kingdom. Appropriate inorganic coatings include sodium silicate, calcium carbonate, aluminum oxide, silicon oxide, kaolin, day, ceramic and mixtures thereof. The inorganic coatings can also be mixed with one or more of the organic coatings set forth above.

If the articles are used as containers or for other products intended to come into contact with foodstuffs, the coating material will preferably include an FDA-approved coating. An example of a particularly useful coating is sodium silicate, which is acid resistant. Resistance to acidity is important, for example, where the article is a container exposed to foods or drinks having a high acid content, such as soft drinks or juices. It is generally unnecessary to protect the article from basic substances, but increased resistance to basic substances can be provided by an appropriate polymer or wax coating, such as those used to coat paper containers.

Polymeric coatings, such as polyethylene, are useful in forming generally thin layers having low density. Low density polyethylene is especially useful in creating containers which are liquid-tight and even pressure-tight to a certain extent Polymeric coatings can also be utilized as an adhesive when heat sealed.

Aluminum oxide and silicon oxide are useful coatings, particularly as a barrier to oxygen and moisture. The coatings can be applied to the article by any means known in the art, including the use of a high energy electron beam evaporation process, chemical plasma deposition and sputtering. Another method of forming an aluminum oxide or silicon oxide coating involves treating article with an aqueous solution having an appropriate pH level to cause the formation of aluminum oxide or silicon oxide on the article due to the composition of the article.

Waxes and wax blends, particularly petroleum and synthetic waxes, provide a barrier to moisture, oxygen, and some organic liquids, such as grease or oils. They also allow an article such as a container to be heat sealed. Petroleum waxes are a particularly useful group of waxes in food and beverage packaging and include paraffin waxes and microcrystalline waxes.

In some cases, it can be preferable for the coating to be elastomeric or deformable. Some coatings can also be used to strengthen places where the articles are severely bent. In such cases, a pliable, possibly elastomeric, coating can be preferred.

Of course, it should be understood that the starch compositions of the present invention can themselves be used as coating materials in order to form a synergistic composite with, or otherwise improve the properties of, any number of other materials. Such disparate materials such as paper, paperboard, molded starch-bound articles such as starch-based foams, metals, plastics, concrete, plaster, ceramics, and the like can be coated with starch composition.

It can be desirable to apply print or other indicia, such as trademarks, product information, container specifications, or logos, on the surface of the article. This can be accomplished using any conventional printing means or processes known in the art of printing paper or cardboard products, including planographic, relief, intaglio, porous, and impactless printing. Conventional printers include offset, Van Dam, laser, direct transfer contact, and therrographic printers. However, essentially any manual or mechanical means can be used.

In a further aspect of the present invention, it is recognized that to facilitate the coating of the molded article, as well as for other specific indications, the amount of paper pulp can be increased to 50%, or 30-50%, by weight of the final mixture, and the amount of wood flour or fiber can be decreased to 0%.

When using a vacuum to form a film around the molded article, increasing the levels of wood flour/fiber and/or paper pulp can facilitate the vacuuming process. For example, wood flour/fiber and/or paper pulp levels can be increased to 30, 40 or 50% by weight of the final mixture.

Types of Articles Produced

Materials capable of holding dry, damp and wet products have diverse uses. Containers suitable for holding dry materials can be used to hold dried fruit, or raw nuts such as almonds. Containers suitable for holding damp materials can be used to hold fresh mushrooms or tomatoes (for example in groups of 4 or 6) and should be able to perform this function for a period of at least about two to three weeks since normal packing to use time is about 14 days. Damp food packing can also be used with a hot fast food item such as french fries or hamburger, in which case the container needs to last for only a short time, for example about one hour after addition of the damp food. Damp food packing could also be used, in combination with an adsorbent pad, to package raw meat. In this case, the container needs to withstand exposure to the meat for a period of seven days or longer and desirably can stand at least one cycle of freeze and thaw. If possible this package should be able to withstand a microwave signal. When formulated for holding wet foods, the containers of the invention will suitably have the ability to hold a hot liquid, such as a bowl of soup, a cup of coffee or other food item for a period of time sufficient to allow consumption before cooling, for example within one hour of purchase. Such containers can also be used to hold a dry product that will be re-hydrated with hot water such as the soup-in-a-cup products.

Articles made from the present invention to can be manufactured into a wide variety of finished articles that can presently be made plastics, paper, paperboard, polystyrene, metals, ceramics, and other materials. Merely by way of example, it is possible to manufacture the following exemplary articles: films, bags, containers, including disposable and nondisposable food or beverage containers, cereal boxes, sandwich containers, "clam shell" containers (including, but not limited to, hinged containers used with fast-food sandwiches such as hamburgers), drinking straws, baggies, golf tees, buttons, pens, pencils, rulers, business cards, toys, tools, Halloween masks, building products, frozen food boxes, milk cartons, fruit juice containers, yoghurt containers, beverage carriers (including, but not limited to, wraparound basket-style carriers, and "six pack" ring-style carriers), ice cream cartons, cups, french fry containers, fast food carryout boxes, packaging materials such as wrapping paper, spacing material, flexible packaging such as bags for snack foods, bags with an open end such as grocery bags, bags within cartons such as a dry cereal box, multiwell bags, sacks, wraparound casing, support cards for products which are displayed with a cover (particularly plastic covers disposed over food products such as lunch meats, office products, cosmetics, hardware items, and toys), computer chip boards, support trays for supporting products (such as cookies and candybars), cans, tape, and wraps (including, but not limited to, freezer wraps, tire wraps, butcher wraps, meat wraps, and sausage wraps); a variety of cartons and boxes such as corrugated boxes, cigar boxes, confectionery boxes, and boxes for cosmetics, convoluted or spiral would containers for various products (such as frozen juice concentrate, oatmeal, potato chips, ice cream, salt, detergent, and motor oil), mailing tubes, sheet tubes for rolling materials (such as wrapping paper, cloth materials, paper towels and toilet paper), and sleeves; printed materials and office supplies such as books, magazines, brochures, envelopes, gummed tape, postcards, three-ring binders, book covers, folders, and pencils-, various eating utensils and storage containers such as dishes, lids, straws, cutlery, knives, forks, spoons, bottles, jars, cases, crates, trays, baking trays, bowls, microwaveable dinner trays, "TV" dinner trays, egg cartons, meat packaging platters, disposable plates, vending plates, pie plates, and breakfast plates, emergency emesis receptacles (i.e., "barf bags"), substantially spherical objects, toys, medicine vials, ampules, animal cages, firework shells, model rocket engine shells, model rockets, coatings, laminates, and an endless variety of other objects.

The container should be capable of holding its contents, whether stationary or in movement or handling, while maintaining its structural integrity and that of the materials contained therein or thereon. This does not mean that the container is required to withstand strong or even minimal external forces. In fact, it can be desirable in some cases for a particular container to be extremely fragile or perishable. The container should, however, be capable of performing the function for which it was intended. The necessary properties can always be designed into the material and structure of the container beforehand.

The container should also be capable of containing its goods and maintaining its integrity for a sufficient period of time to satisfy its intended use. It will be appreciated that, under certain circumstances, the container can seal the contents from the external environments, and in other circumstances can merely hold or retain the contents.

The terms "container" or "containers" as used herein, are intended to include any receptacle or vessel utilized for, e.g., packaging, storing, shipping, serving, portioning, or dispensing various types of products or objects (including both solids and liquids), whether such use is intended to be for a short-term or a long-term duration of time.

Containment products used in conjunction with the containers are also intended to be included within the term "containers." Such products include, for example, lids, straws, interior packaging, such as partitions, liners, anchor pads, corner braces, corner protectors, clearance pads, hinged sheets, trays, funnels, cushioning materials, and other object used in packaging, storing, shipping, portioning, serving, or dispensing an object within a container.

The containers within the purview of the present invention can or can not be classified as being disposable. In some cases, where a stronger, more durable construction is required, the container might be capable of repeated use. On the other hand, the container might be manufactured in such a way so as to be economical for it to be used only once and then discarded. The present containers have a composition such that they can be readily discarded or thrown away in conventional waste landfill areas as an environmentally neutral material.

The articles within the scope of the present invention can have greatly varying thicknesses depending on the particular application for which the article is intended. They can be as thin as about 1 mm for uses such as in a cup. In contrast, they can be as thick as needed where strength, durability, and or bulk are important considerations. For example, the article can be up to about 10 cm thick or more to act as a specialized packing container or cooler. The preferred thickness for most articles is in a range from about 1.5 mm to about 1 cm, with about 2 mm to about 6 mm preferred.

Using a microstructural engineering approach, the present invention can produce a variety of articles, including plates, cups, cartons, and other types of containers and articles having mechanical properties substantially similar or even superior to their counterparts made from conventional materials, such as paper, polystyrene foam, plastic, metal and glass. The inventive articles can also be made at a fraction of the cost of their conventional counterparts. The minimal cost is a result of the relatively inexpensive aggregate which typically comprises a large percentage of the mixture and the minimum processing energy required.

The method of the present invention provides basic methodologies which can be utilized with little modification and a basic material from which product items can be produced by tailoring of the additives and additional processing steps employed. The composition preferably contains at least 75%, at least 85% or at least 95% or more of natural or organic-derived materials by weight of the homogenous moldable composition.

EXAMPLES

The following examples are presented in order to more specifically teach compositions and process conditions for forming the thermoplastic starch compositions according to the present invention, as well as articles therefrom. The examples include various mix designs, as well as various processes for manufacturing thermoplastic starch compositions, including sheets, films, pellets, containers, and other articles of manufacture.

Examples of Articles Formed from Pregelled Starch Suspensions

Example Mixture A 31.5 gm of 5% potato starch gel
18 gm of dry corn starch
6 gm of dry wood flour [60 mesh soft wood]

Test characteristics—the thick stiff mixture was flat molded in a 4"×4" flat mold at a low pressure (between 2 and 3 psi) to a thickness of 3 mm. The mold temperature was 250° C. 25 grams of the mixture was molded. The test item was both dry and strong after molding. The strength test was 9 (on a scale of 10, with 1=breaks with little resistance and 10=breaks with significant resistance. A styrofoam tray for meat=8 on this scale and a styrofoam burger clamshell box=5). This mixture was to test a thick mixture and was determined that for a complete molded test item the mixture had to pre shaped into a flat rolled sheet about 2" square.

Example Mixture B 5 gm 5% potato starch gel
19.5 gm of 15% corn starch gel
0.125 gm of 80 mesh softwood flour
0.125 gm baking powder—[added to elevate the number of open cells in the final structure by introducing a source of carbon dioxide released by heat and water.]

The flat test [2-3 psi and 250° C. mold] item was dry and had a large number of air cells in the cross linked test pad. The strength test was 2 indicating that items molded from this mixture would be used for low breakage packaging, such as shock spacers.

Example Mixture C 16.3% 3% potato starch gel
5.9% dry corn starch
14% 80 mesh softwood flour
1% dry baking powder
1% glycerol-[added to produce a product that would release from the mold and to produce a smoother surface on the finished product.]

The flat test [2-3 psi and 250 deg C. mold] item has a stronger strength index of 4, greater than mixture C with the same open cell structure. This mixture will allow for a stronger product, while still retaining the open cell structure for items such as spacers in packing boxes, e.g., dimpled trays to separate layers of apples in a packing box. This item would, as mixture C, provide good shock protection [crush strength].

Example Mixture D

25% of a 3% potato starch gel
57% of a 15% corn starch gel
17% 80 mesh softwood flour
1% baking powder To this mixture was added various amounts of natural material fillers in a effort to reduce the cost per item. In this test group powdered calcium carbonate or bentonite clay was added to the potato starch gel before mixing with the corn starch/wood flour mix. At low levels [up to 5% there is no effect on the strength or amount of entrapped air pockets, suggesting that low levels of these two fillers are appropriate]. At higher levels the basic formulation had to be changed to accommodate the chemical and physical changes that the fillers produced.

Example Mixture E 10 gms of a gel mix of 5% potato starch & 20% bentonite clay
6 gms of dry corn starch
7 gms of 80 mesh softwood flour
1 gm glycerol
6 grams of water Test characteristics—the thick stiff mixture was flat molded in a 4"×4" flat mold at a low pressure [between 2 and 3 psi] to a thickness of 3 mm. The mold temperature was 250° C. 25 grams of the mixture was molded. The test item was both dry and strong after molding. The strength test was 7 with a high level of entrained air pockets. This type of product is hard and has a high degree of strength for use as a primary package. The inclusion of the clay produces a product with higher strength, in addition to reducing the unit cost.

Example F 16.3 gms of a 5% potato starch gel
5.9 gms of dry corn starch
3.8 gms of 80 mesh softwood flour
1 gm of glycerol Test characteristics—the thick mixture was flat molded in a 4"×4" flat mold at a low pressure [between 2 and 3 psi] to a thickness of 3 mm. The mold temperature was 250° C. 25 grams of the mixture was molded. The test item was both dry and strong after molding. The strength test was 8 with a very high level of entrained air pockets.

Example G 15.1 gms of a 5% potato starch gel
9.1 gms of dry corn starch
4.3 gms of 80 mesh softwood flour
1 gm of glycerol Test characteristics—the somewhat thick mixture was flat molded in a 4"×4" flat mold at a low pressure (between 2 and 3 psi) to a thickness of 3 mm. The mold temperature was 250° C. 25 grams of the mixture was molded. The test item was both dry and strong after molding. The strength test was 9 with a high level of entrained air pockets. This mixture is the strongest of the basic formula tests using a mixture that was thick. The next test was to use the same basic formula but with additional water to allow the mixture to be injected as a thinner mix.

Example H 15.1 gms of a 5% potato starch gel
9.1 gms of dry corn starch
4.3 gms of 80 mesh softwood flour
1 gm glycerol
4 gms of water Test characteristics—the thinner mixture was flat molded in a 4"×4" flat mold at a low pressure (between 2 and 3 psi) to a thickness of 3 mm. The mold temperature was 250° C. 25 grams of the mixture was molded. The test item was both dry and strong after molding. The strength test was 9 with a high level of entrained air pockets. The addition of more water allowed the product to fill the mold more quickly thereby producing a product with strength similar to styrofoam (2 mm thickness standard production). Three millimeter thick trays were made by molding for various times between 3 and 5 minutes at temperatures between 300 and 375° F. using the following formulations. Satisfactory products were obtained.

Example I 10.8 gm wood flour [6020 grade]
23.2 gm corn starch
41.8 gm 5% pre-gelled potato starch in water
12 gm 20% bentonite clay slurry in water

Example J 10.8 gm of wood flour [6020 grade]
23.2 gm corn starch
41.8 gm of 7.5% pre-gelled potato starch in water 2 mm thick tray were molded at various times between 45 seconds and 2 minutes at temperatures between 350 and 450° F. using the following formulations. Satisfactory products were obtained.

Example K 10.8 gm wood flour [4025 grade]
23.2 gm corn starch
3.3 gm potato starch
41.8 gm 10% pre-gelled potato starch in water

Example L 10.8 gm wood flour [4025 grade]
23.2 gm corn starch
3.1 gm potato starch
3.3 gm bentonite clay
41.8 gm of 10% pre-gelled potato starch in water These trays (in the above examples) have also been coated with a thin film of food grade polymer and/or food grade paraffin wax A specific aspect of this product is the observation that the addition of components is very important. When the dry ingredients, such as corn starch and wood flour are added to the potato starch gel, without premixing into a homogenous mixture, the product suffers a dramatic reduction in strength and will not spread evenly in the mold, producing open voids and unfilled corners. The observation of specific addition was seen in a dozen or more trial mixtures that used a different order of mixing of components. In addition the surface of the molded product can be rough vs the smooth surface of sequentially mixed products. More recently the product was tested in a three dimensional mold, using classic compression molding techniques, i.e., heated mold with a constant pressure applied during the process. In these test the requirement for a specific order of mixing was also observed and when this order was not observed the finished product suffered significant problems, including incomplete product spread during the molding process, reduction in smoothness of the molded product and a reduction in strength, as measured by classic penetrometer methods.

Example M

1. Form pregelled paper potato starch suspension:
    57.5 g potato starch: 8.5%
    43.2 g recycled paper pulp: 6.3%
    575 g water: 85%

Add components, heat to 60-70° C. (ideal) 65° C. with mixing on high speed with a wire whisk to form gel. Once gelled, it is a stable gel that can be cooled, refrigerated, etc, but not frozen.

2. Premix the following materials:
    92.3 g wood flour (aspect ratio 1:4)
    132.7 g potato starch
    159 g corn starch
    to from homogeneous mixture 3. Add homogenous mixture of wood and starches with the pregelled paper potato starch, mix with a dough hook mixer on low speed This mixture is stable and can be cooled, refrigerated, etc, but not frozen.

4. Place mixture into mold (50-55 g) and bake at 195-225.degree. C. (ideal 215.degree. C.) for 60-90 seconds (ideal 75)

5. Coating: Especially like PROTECOAT® 6616B by New Coat, Inc, commercial, biodegradable, acrylic based, FDA approved for food.

Examples of Articles Formed from Pregelled Paper Starch Suspensions

Example N

1. Form pregelled paper potato starch suspension:
    57.5 g dry potato starch: 8.5%
    42.31 g recycled paper pulp: 6.2%
    580 g water: 85.3%

Add components in a mixer, heat to 60-70° C. (ideal temp 65° C.) with mixing on low RPM with a wire whisk to form gel. When the paper pulp is dispersed, and as the temperature begins to rise (above 30° C.), the RPM of the mixer is increased until the maximum RPM is reached.

The heating continues until the temp reaches 65.degree. C. At this time, the mixture is a homogeneous gel suspension. The heat is turned off and beater heads changed to classic dough hook and speed is lowered to 10% of maximum KITCHENAID®. Alternatively, for smaller batches, see for example, step #2 below, the mixing is done by hand. Once gelled, it is a stable gel that can be cooled, refrigerated, etc, but not frozen.

2. Premix the following materials:
    4.8 g wood flour (aspect ratio 1:4 or less)
    6.9 g potato starch
    8.3 g corn starch
    to form homogeneous mixture
3. Add homogenous mixture of wood and starches to 29.9 g of the pregelled paper potato starch, mix with a dough hook mixer on low speed. This mixture is stable and can be cooled or refrigerated, but not frozen.
4. Place mixture into mold (50-55 g) and bake at 195-225° C. (ideal 215° C.) for 60-90 seconds (ideal 75° C.)
5. Coating: Especially like PROTECOAT® 6616B by New Coat, Inc, commercial, biodegradable, acrylic based, FDA approved for food.

The following examples and formulas work with both the compression molding process and injection molding processes to produce strong products as measured by pentrometers. In addition, these examples and formulas produce products with thicknesses between 1.5 and 3.0 mm, for example, thicknesses of 1.5 mm, 1.75 mm, 2.0 mm or 3.0 mm.

| List of Ingredients | Weight in grams mixed by Formula ID # | | | |
|---|---|---|---|---|
|  | O | P | Q | R |
| 4025 wood flour | 4.8 | 4.8 | 4.5 | 5.0 |
| Potato starch | 6.9 | 5.9 | 6.5 | 7.2 |
| Corn starch | 8.3 | 9.3 | 7.8 | 8.6 |
| paper pulp | 2.2 | 2.2 | 2.1 | 2.3 |
| 10% Potato starch gel | 29.9 | 29.9 | 31 | 28.9 |
| Total wt. Molded | 52.1 | 52.1 | 51.9 | 52.0 |

Each modification listed in the above table is based on what works best for a specific flexibility and/or method of molding. For example, as you change the concentration of potato starch, the flexibility will change.

| List of Ingredients | Weight in grams mixed by Formula ID # | |
|---|---|---|
|  | S | T |
| 4025 wood flour | 6.7 | 4.8 |
| Potato starch | 9.6 | 6.9 |
| Corn starch | 11.6 | 8.3 |
| paper pulp | 3.1 | 2.2 |
| 10% Potato starch gel | 41.8 | 29.9 |
| Total wt. Molded | 72.8 | 52.0 |
| Thickness of Mold | 3 mm. (deeper sides than #T) | 2 mm. |

| List of Ingredients | Weight in grams mixed by Formula ID # | | |
|---|---|---|---|
|  | U-1 | U-2 | U-3 |
| 4025 wood flour | 3.3 | 5.6 | 3.5 |
| Potato starch | 6.2 | 10.5 | 6.6 |
| Corn starch | 6.1 | 10.3 | 6.5 |
| paper pulp | 1.8 | 3.0 | 1.9 |
| 10% Potato starch gel | 27.6 | 46.6 | 29.4 |
| Total wt. Molded | 45 | 76.0 | 48 |
| Thickness of Mold | 2 mm. | 3 mm. | 2 mm. |

| List of Ingredients | Weight in grams mixed by Formula ID # | | |
|---|---|---|---|
|  | V-1 | V-2 | V-3 |
| 4025 wood flour | 4.8 | 8.2 | 5.4 |
| Potato starch | 6.9 | 11.8 | 7.8 |
| Corn starch |  |  |  |
| paper pulp | 1.8 | 3.1 | 2.0 |
| 10% Potato starch gel | 29.9 | 51.0 | 33.8 |
| Total wt. Molded | 43.4 | 74.0 | 49 |
| Thickness of Mold | 2 mm. | 3 mm. | 2 mm. |

| List of Ingredients | Weight in grams mixed by Formula ID # | |
|---|---|---|
|  | W-1 | W-2 |
| 4025 wood flour | 3.8 | 6.3 |
| Potato starch | 6.9 | 11.5 |
| Corn starch | 2 | 3.3 |
| paper pulp | 1.8 | 3.0 |
| 10% Potato starch gel | 29.8 | 49.8 |
| Total wt. Molded | 44.4 | 74.0 |
| Thickness of Mold | 2 mm. | 3 mm. |

The invention has been described with reference to various specific and preferred embodiments and techniques. However, it should be understood that many variations and modifications will be obvious to those skilled in the art from the foregoing detailed description of the invention and may be made while remaining within the spirit and scope of the invention.

We claim:

1. A process for forming a biodegradable material by:
    (a) forming a pre-gelled starch suspension that is maintained between approximately 0 and 60° C.;
    (b) adding to the pre-gelled starch suspension a dry or damp, homogeneous mixture containing at least wood fibers having an aspect ratio between approximately 1:2 and 1:8 width:length to form a homogenous moldable composition; and
    (c) molding the homogenous moldable composition with heat to form a biodegradable material.
2. The process of claim 1, wherein the homogenous mixture further comprises a second pre-gelled starch suspension, and/or a native starch.

3. The process of claim 1 wherein the pre-gelled starch suspension is a pre-gelled paper starch suspension.

4. The process of claim 3, wherein the pre-gelled starch suspension comprises approximately 2-15% potato starch by weight of the pre-gel; approximately 5-10% paper pulp by weight of the pre-gel; and approximately 75-95% water by weight of the pre-gel such that the pre-gelled suspension is maintained at low temperatures; and wherein the homogenous mixture comprises wood fibers or flour having an aspect ratio between approximately 1:2 and 1:8, native corn starch and native potato starch.

5. The process of claim 1 further comprising adding a material selected from the following list to the wood fibers to form a homogeneous mixture: (i) waxes, fatty alcohols, phospholipids or other high molecular weight biochemicals; (ii) approximately 0.5-20% water by weight of the homogenous moldable composition; (iii) baking powder; and/or (iv) natural earth fillers, clays, bentonite, amorphous raw products, gypsum or calcium sulfate, minerals or man made inert fillers.

6. The process of claim 1, wherein the pregelled starch suspension is produced from approximately 2.5-15% starch by weight of the pre-gel, and from approximately 85-97.5% of water by weight of the homogenous moldable composition.

7. The process of claim 1, wherein the pre-gelled starch suspension is produced from approximately 2.5-5.5% starch and from approximately 94.5-97.5% water.

8. The process of claim 1, wherein the pre-gelled starch suspension is produced from approximately 2.5-10% potato starch, and 90 to 97.5% water by weight of the pre-gel.

9. The process of claim 1, wherein the pre-gelled starch suspension is produced from approximately 15% corn starch by weight of the pre-gel.

10. The process of claim 1, wherein the pregelled paper starch solution is produced from approximately 5-10% paper pulp by weight of the pre-gel, approximately 5-15%, natural starch, and approximately 75-90% water by weight of the pre-gel.

11. The process of claim 1, wherein the starch is corn starch or potato starch.

12. The process of claim 1, wherein the starch is a mixture of potato starch and corn starch.

13. The process of claim 1, wherein corn starch comprises approximately 4-18%, by weight of the homogenous moldable composition.

14. The process of claim 1, wherein wood fibers or flour comprise approximately 11-24% of the homogenous moldable composition that contains the pregelled starch solution.

15. The process of claim 1, wherein the wood fibers or flour comprise approximately 7-11% by weight of the homogenous moldable composition that contains the pregelled paper starch solution.

16. A biodegradable, compostable material made according to a process of claim 1.

17. The process of claim 1 further comprising using pressure in combination or alternation with heat to mold the biodegradable material.

18. The process of claim 17, wherein the heat used to mold the biodegradable materials is between approximately 150-250° C. and the pressure is between 2-3 psi.

19. The material of claim 16 coated with a suitable liquid-resistant coating.

20. The material of claim 16, wherein the material is in the form of a cup, a tray, a bowl, a plate, or a utensil.

21. The process of claim 4, wherein the potato starch is about 2.5% by weight of the pre-gel.

22. The process of claim 4, wherein the potato starch is about 5% by weight of the pre-gel.

23. The process of claim 4, wherein the potato starch is about 10% by weight of the pre-gel.

24. The process of claim 4, wherein the potato starch is about 15% by weight of the pre-gel.

25. The process of claim 4, wherein the paper pulp is about 5.9% by weight of the pre-gel.

26. The process of claim 4, wherein the paper pulp is about 7.3% by weight of the pre-gel.

27. The process of claim 4, wherein the paper pulp is about 8% by weight of the pre-gel.

28. The process of claim 4, wherein wood fibers or flour have an aspect ratio between about 1:2 and 1:4.

29. The process of claim 5, wherein the high molecular weight biochemical is glycerol.

30. The process of claim 5, wherein the mineral is limestone.

* * * * *